US011420686B2

(12) United States Patent
Matsuda et al.

(10) Patent No.: US 11,420,686 B2
(45) Date of Patent: Aug. 23, 2022

(54) LOWER VEHICLE-BODY STRUCTURE OF ELECTRIC VEHICLE

(71) Applicant: MAZDA MOTOR CORPORATION, Hiroshima (JP)

(72) Inventors: Yamato Matsuda, Aki-gun (JP); Nobuyuki Nakayama, Aki-gun (JP); Morihide Yamada, Aki-gun (JP); Katsuhito Kouno, Aki-gun (JP); Toshihiro Takebayashi, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 326 days.

(21) Appl. No.: 16/833,377

(22) Filed: Mar. 27, 2020

(65) Prior Publication Data

US 2020/0361535 A1 Nov. 19, 2020

(30) Foreign Application Priority Data

May 15, 2019 (JP) .............................. JP2019-092089
May 15, 2019 (JP) .............................. JP2019-092090
May 15, 2019 (JP) .............................. JP2019-092094

(51) Int. Cl.
*B62D 25/20* (2006.01)
*B60R 7/06* (2006.01)
*B62D 21/04* (2006.01)
*B62D 21/09* (2006.01)
*B62D 27/02* (2006.01)
*B60K 1/04* (2019.01)
*B60R 11/00* (2006.01)

(52) U.S. Cl.
CPC ................ *B62D 25/20* (2013.01); *B60R 7/06* (2013.01); *B62D 21/04* (2013.01); *B62D 21/09* (2013.01); *B62D 25/2036* (2013.01); *B62D 27/023* (2013.01); *B60K 1/04* (2013.01); *B60R 2011/0007* (2013.01)

(58) Field of Classification Search
CPC .. B62D 25/20; B60K 1/04; B60K 2001/0405; B60K 2001/0438
USPC ........... 296/37.8, 24.34, 193.07, 193.09, 204
See application file for complete search history.

(56) References Cited

U.S. PATENT DOCUMENTS 11,220,298 B2 * 1/2022 Matsuda ................ B62D 25/20
11,299,211 B2 * 4/2022 Matsuda ................ B62D 25/20
(Continued)

FOREIGN PATENT DOCUMENTS

| JP | 2013-147137 A | 8/2013 |
| JP | WO2012/063393 A1 | 5/2014 |
| JP | 2019-23029 A | 2/2019 |

*Primary Examiner* — Dennis H Pedder
(74) *Attorney, Agent, or Firm* — Studebaker & Brackett PC

(57) ABSTRACT

A lower vehicle-body structure of the electric vehicle includes a pair of left and right side sills; a substantially flat front floor panel; a first floor cross member disposed on an upper surface of the front floor panel located below a front part of a front seat; a second floor cross member disposed on an upper surface of the front floor panel 8 located below a rear part of the front seat; a kick-up portion raised from a rear end of the front floor panel 8 toward a vehicle upper side; and a console support bracket that has a front part connected to a vehicle body on a vehicle front side and a rear part connected to the kick-up portion. A lower part of the console support bracket is secured to the first and second floor cross members.

20 Claims, 19 Drawing Sheets

(56) References Cited

U.S. PATENT DOCUMENTS

| | | |
|---|---|---|
| 2007/0126264 A1 | 6/2007 | Mizuma et al. |
| 2013/0229030 A1* | 9/2013 | Yamaguchi ............ B62D 25/20 |
| | | 296/193.07 |
| 2017/0197666 A1 | 7/2017 | Kabayama |
| 2019/0009832 A1 | 1/2019 | Kageyama |
| 2020/0031399 A1 | 1/2020 | Matsuda et al. |

* cited by examiner

LOWER VEHICLE-BODY STRUCTURE OF ELECTRIC VEHICLE

BACKGROUND

Technical Field

The present disclosure relates to a lower vehicle-body structure of an electric vehicle, for example, including no exhaust pipe on a vehicle lower side of a floor panel.

Background Art

Recently, there has been a growth in the use of electric vehicles that use output from a rotary electric machine as a drive force, instead of an internal combustion engine using gasoline or the like as fuel. In such an electric vehicle, an on-vehicle battery that supplies power to the rotary electric machine is disposed, for example, on a vehicle lower side of a floor panel that forms a vehicle interior floor surface, as described, for example, in International Publication No. WO2012/063393 and Japanese Patent Laid-Open No. 2013-147137.

International Publication No. WO2012/063393 discloses a vehicle-body structure in which a floor cross member disposed on an upper surface of a floor panel and connecting left and right side sills in a vehicle-width direction is disposed across a tunnel provided substantially at a middle of the floor panel in the vehicle-width direction. Japanese Patent Laid-Open No. 2013-147137 discloses a vehicle-body structure in which a floor cross member disposed on an upper surface of a floor panel and connecting left and right side sills in a vehicle-width direction is disposed across a tunnel provided substantially at a middle of the floor panel in the vehicle-width direction.

In International Publication No. WO2012/063393 and Japanese Patent Laid-Open No. 2013-147137, the tunnel protruding toward a vehicle upper side and extending in a vehicle front-rear direction is formed substantially at the middle of the floor panel in the vehicle-width direction. Such a tunnel of the floor panel is conventionally used as a space in which an exhaust pipe is disposed that discharges exhaust gas generated in an internal combustion engine from a vehicle rear part to outside, and is unnecessary for an electric vehicle that requires no exhaust pipe.

Further, for the electric vehicle that requires no exhaust pipe, there is an expectation for a reduction in vehicle weight and an increase in space under occupant's feet by eliminating the tunnel. Thus, for the electric vehicle that requires no exhaust pipe, it is considered to eliminate the tunnel used as a space in which the exhaust pipe is disposed, and to form a vehicle interior floor surface from a relatively flat floor panel and a floor cross member.

However, the conventional tunnel also functions as a transfer member that transfers a collision load from a vehicle front side to a vehicle rear side. Thus, if the tunnel of the floor panel is eliminated, it is necessary to provide a load transfer path in place of the tunnel and transfer the collision load from the vehicle front side to the vehicle rear side to ensure desired resistance to front-end collision.

Further, the conventional tunnel also functions as a support that supports a center console. Thus, if the tunnel of the floor panel is eliminated, it is necessary to separately provide a support member that supports the center console. On the other hand, if desired resistance to front-end collision and a support structure for the center console are ensured by a tunnel-like structure, a weight reducing effect by eliminating the tunnel cannot be obtained.

SUMMARY

In view of the above described problems, the present disclosure provides a lower vehicle-body structure of an electric vehicle that can prevent an increase in weight, ensure desired resistance to front-end collision, and reduce weight of a support structure for a center console.

The present disclosure provides a lower vehicle-body structure of an electric vehicle that uses output from a rotary electric machine as a drive force, including a pair of left and right side sills extending in a vehicle front-rear direction; a substantially flat floor panel disposed between the side sills; a first floor cross member disposed on an upper surface of the floor panel located below a front part of a front seat on which an occupant sits and connecting the left and right side sills in a vehicle-width direction; and a second floor cross member disposed on an upper surface of the floor panel located below a rear part of the front seat and connecting the left and right side sills in the vehicle-width direction; a kick-up portion raised from a rear end of the floor panel toward a vehicle upper side. The lower vehicle-body structure further includes a console support bracket that has a front part connected to a vehicle body on a vehicle front side and a rear part connected to the kick-up portion, and supports a center console, a lower part of the console support bracket being secured to the first floor cross member and the second floor cross member. The substantially flat floor panel is a floor panel including no tunnel protruding toward the vehicle upper side and extending in the vehicle front-rear direction.

The present disclosure can prevent an increase in weight, ensure desired resistance to front-end collision, and reduce weight of a support structure for the center console. Specifically, the console support bracket extending in the vehicle front-rear direction is secured to the first floor cross member and the second floor cross member connecting the left and right side sills in the vehicle-width direction. Thus, the lower vehicle-body structure of the electric vehicle can distribute and transfer, in the vehicle front-rear direction via the console support bracket, a collision load applied from a vehicle lateral side to the first floor cross member and the second floor cross member.

Further, the front part of the console support bracket is connected to the vehicle body on the vehicle front side, and the rear part of the console support bracket is connected to the kick-up portion. Thus, the lower vehicle-body structure of the electric vehicle can transfer a collision load from the vehicle front side to the vehicle rear side via the console support bracket.

In this case, the lower vehicle-body structure of the electric vehicle can distribute and transfer the collision load from the vehicle front side via the first floor cross member and the second floor cross member. Thus, the lower vehicle-body structure of the electric vehicle can ensure rigidity of a vehicle interior floor surface against the collision load from the vehicle lateral side and the collision load from the vehicle front side.

In addition, the lower part of the console support bracket is secured to the first floor cross member and the second floor cross member. Thus, the lower vehicle-body structure of the electric vehicle can reduce a length of the console support bracket in the vehicle up-down direction as compared to when the console support bracket is secured to the floor panel.

Thus, for example, even if a length of the console support bracket in the vehicle front-rear direction is substantially the same as a length of a tunnel in the vehicle front-rear direction when the floor panel includes the tunnel, the lower vehicle-body structure of the electric vehicle can reduce weight of the console support bracket by the length in the vehicle up-down direction. Thus, the lower vehicle-body structure of the electric vehicle can prevent an increase in weight, ensure desired resistance to front-end collision, and reduce weight of the support structure for the center console.

As an aspect of the present disclosure, the console support bracket may include a pair of left and right bracket side walls facing each other in the vehicle-width direction and a bracket upper surface connecting upper ends of the bracket side walls, and have a substantially inverted U-shaped vertical section along the vehicle-width direction. According to the present disclosure, the lower vehicle-body structure of the electric vehicle can form ridges substantially linearly extending in the vehicle front-rear direction at corners between the bracket side walls and the bracket upper surface.

Thus, the lower vehicle-body structure of the electric vehicle can efficiently transfer the collision load from the vehicle front side to the vehicle rear side along the ridges of the console support bracket. Thus, the lower vehicle-body structure of the electric vehicle can reduce weight of the support structure for the center console and ensure stable resistance to front-end collision.

As an aspect of the present disclosure, the bracket side walls of the console support bracket may include flanges extending from lower ends of the bracket side walls toward vehicle-width-direction outer sides. According to the present disclosure, the lower vehicle-body structure of the electric vehicle can form ridges substantially linearly extending in the vehicle front-rear direction at bases of the flanges.

Thus, the lower vehicle-body structure of the electric vehicle can more efficiently transfer the collision load from the vehicle front side to the vehicle rear side along the ridges at the corners between the bracket side walls and the bracket upper surface and the ridges at the bases of the flanges. Thus, the lower vehicle-body structure of the electric vehicle can reduce weight of the support structure for the center console and ensure more stable resistance to front-end collision.

As an aspect of the present disclosure, the flanges of the console support bracket may be fastened to the first floor cross member and the second floor cross member. According to the present disclosure, the lower vehicle-body structure of the electric vehicle can efficiently secure the console support bracket to the first floor cross member and the second floor cross member.

As an aspect of the present disclosure, the first floor cross member and the second floor cross member may include, in vertical sections along the vehicle-width direction, upper enlarged sections with sections enlarged toward the vehicle upper side substantially at a middle in the vehicle-width direction so that upper surfaces of the first floor cross member and the second floor cross member substantially at the middle in the vehicle-width direction are located on the vehicle upper side with respect to upper surfaces near ends in the vehicle-width direction, and the flanges of the console support bracket may be fastened to the upper enlarged section of the first floor cross member and the upper enlarged section of the second floor cross member. According to the present disclosure, the lower vehicle-body structure of the electric vehicle can ensure stable resistance to lateral collision and further reduce weight of the support structure for the center console.

Specifically, the first floor cross member and the second floor cross member include the upper enlarged sections. Thus, the lower vehicle-body structure of the electric vehicle can increase rigidity of the first floor cross member and the second floor cross member, which are long in the vehicle-width direction, substantially at the middle in the vehicle-width direction. Thus, the lower vehicle-body structure of the electric vehicle can increase rigidity of the vehicle interior floor surface against the collision load from the vehicle lateral side.

Further, the flanges of the console support bracket are fastened to the upper enlarged section of the first floor cross member and the upper enlarged section of the second floor cross member. Thus, the lower vehicle-body structure of the electric vehicle can reduce the length of the console support bracket in the vehicle up-down direction as compared to when the flanges of the console support bracket are fastened to upper surfaces adjacent to the upper enlarged sections in the vehicle-width direction. Thus, the lower vehicle-body structure of the electric vehicle can ensure stable resistance to lateral collision and further reduce weight of the support structure for the center console.

As an aspect of the present disclosure, the floor panel may include an expanding portion expanding toward the vehicle upper side on the vehicle front side of the first floor cross member, and the bracket upper surface and the left and right bracket side walls of the console support bracket may be secured to the expanding portion of the floor panel.

According to the present disclosure, the lower vehicle-body structure of the electric vehicle can increase support rigidity of the front part of the console support bracket as compared to, for example, when only the bracket upper surface of the console support bracket is secured to the expanding portion of the floor panel.

Further, the lower vehicle-body structure of the electric vehicle can transfer the collision load from the vehicle front side to the console support bracket via a securing area between the expanding portion of the floor panel and the bracket upper surface and securing areas between the expanding portion of the floor panel and the bracket side walls. Thus, the lower vehicle-body structure of the electric vehicle can efficiently transfer the collision load from the vehicle front side to the console support bracket and thus ensure more stable resistance to front-end collision.

As an aspect of the present disclosure, the lower vehicle-body structure of the electric vehicle may include a kick-up reinforcing portion connecting a substantial middle of the kick-up portion in the vehicle-width direction and the floor panel in front of the substantial middle of the kick-up portion. The kick-up reinforcing portion may integrally include a pair of left and right side walls facing each other in the vehicle-width direction, a front wall connecting front ends of the side walls, and an upper surface connecting upper ends of the side walls, the bracket upper surface of the console support bracket may be fastened to the upper surface of the kick-up reinforcing portion, and the bracket side walls of the console support bracket may be fastened to the side walls of the kick-up reinforcing portion.

According to the present disclosure, the lower vehicle-body structure of the electric vehicle can increase support rigidity of the rear part of the console support bracket as compared to, for example, when only the bracket upper surface of the console support bracket is secured to the kick-up reinforcing portion.

Further, the lower vehicle-body structure of the electric vehicle includes the kick-up reinforcing portion connecting the kick-up portion and the floor panel for reinforcement, and thus can increase support rigidity of the kick-up portion against a load in the vehicle front-rear direction. Thus, the lower vehicle-body structure of the electric vehicle can efficiently transfer the collision load from the vehicle front side farther toward the vehicle rear side via the kick-up portion.

In addition, the lower vehicle-body structure of the electric vehicle can transfer a collision load from the vehicle rear side to the vehicle front side via the console support bracket and distribute and transfer the collision load to the floor panel via the kick-up reinforcing portion when the collision load is applied from the vehicle rear side.

Thus, the lower vehicle-body structure of the electric vehicle can prevent a rear floor panel connected to the vehicle rear side of the kick-up portion from being deformed to curve toward the vehicle upper side around a lower end of the kick-up portion, for example, when the collision load is applied from the vehicle rear side. Thus, the lower vehicle-body structure of the electric vehicle can prevent an increase in weight and ensure both stable resistance to front-end collision and stable resistance to rear-end collision.

As an aspect of the present disclosure, the lower vehicle-body structure of the electric vehicle may include a standing bracket standing toward the vehicle upper side on the floor panel between the first floor cross member and the second floor cross member, the standing bracket may include a pair of left and right legs secured to the floor panel and an upper surface connecting upper ends of the legs, and the bracket upper surface of the console support bracket may be fastened to the upper surface of the standing bracket.

According to the present disclosure, the lower vehicle-body structure of the electric vehicle can use the standing bracket to increase support rigidity of the console support bracket between the first floor cross member and the second floor cross member. Further, the floor panel can be supported via the console support bracket and the standing bracket. Thus, the lower vehicle-body structure of the electric vehicle can increase rigidity of the floor panel between the first floor cross member and the second floor cross member.

Thus, the lower vehicle-body structure of the electric vehicle can use the standing bracket and the console support bracket to prevent membrane vibration of the floor panel caused by, for example, vehicle body vibration during traveling. Thus, the lower vehicle-body structure of the electric vehicle can ensure much more stable resistance to front-end collision and prevent vibration noise due to the membrane vibration of the floor panel.

As an aspect of the present disclosure, the lower vehicle-body structure of the electric vehicle may include a shift lever support bracket that is secured to the bracket upper surface of the console support bracket and supports the shift lever, the bracket upper surface and the flanges of the console support bracket may be secured to the first floor cross member, the bracket upper surface of the console support bracket may be secured to the standing bracket, and the flanges of the console support bracket may be secured to the second floor cross member. According to the present disclosure, the lower vehicle-body structure of the electric vehicle can prevent bending deformation of the console support bracket and reduce weight of the support structure for the center console.

Specifically, a load in the vehicle front-rear direction applied to the shift lever, a load in the vehicle-width direction, and a load in the vehicle up-down direction are applied to the console support bracket via the shift lever support bracket. Thus, the console support bracket may be bent and deformed by the loads applied to the shift lever, which may cause, for example, reduced shift feeling or unintended vibration noise.

Then, the bracket upper surface and the flanges of the console support bracket are secured to the first floor cross member. Thus, the lower vehicle-body structure of the electric vehicle can support the console support bracket in an area with high rigidity relatively near the shift lever.

Further, the bracket upper surface of the console support bracket is secured to the standing bracket. Thus, the lower vehicle-body structure of the electric vehicle can increase support rigidity of the console support bracket and prevent bending deformation of the bracket upper surface of the console support bracket by cooperation between the first floor cross member relatively near the shift lever and the standing bracket.

On the other hand, the flanges of the console support bracket are secured to the second floor cross member. Thus, the lower vehicle-body structure of the electric vehicle can distribute and transfer, to the standing bracket and the second floor cross member, the load applied from the shift lever to the console support bracket.

In this case, the load applied from the shift lever to the console support bracket decreases toward the vehicle rear side. Thus, the lower vehicle-body structure of the electric vehicle can reduce the number of securing areas of the console support bracket to the standing bracket and the number of securing areas of the console support bracket to the second floor cross member to be smaller than the number of securing areas of the console support bracket to the first floor cross member without reducing support rigidity of the console support bracket.

Thus, the lower vehicle-body structure of the electric vehicle can reduce the number of assembling steps of the console support bracket to the first floor cross member, the standing bracket, and the second floor cross member and prevent an increase in weight due to an increase in securing areas of the console support bracket. Thus, the lower vehicle-body structure of the electric vehicle can prevent bending deformation of the console support bracket and reduce weight of the support structure for the center console.

The present disclosure can provide the lower vehicle-body structure of the electric vehicle that can prevent an increase in weight, ensure desired resistance to front-end collision, and reduce weight of the support structure for the center console. Particularly, the second aspect of the present disclosure provides a lower vehicle-body structure of an electric vehicle in view of the problem that if a height of a floor cross member connecting left and right side sills is reduced to ensure space under occupant's feet, rigidity of a vehicle cabin floor against a collision load from a vehicle lateral side is lower than rigidity of, for example, a vehicle cabin floor including a tunnel, which may prevent desired resistance to lateral collision from being ensured.

In view of the above described problems, the present disclosure provides a lower vehicle-body structure of an electric vehicle that can ensure both space under occupant's feet and desired resistance to lateral collision. The second aspect of the present disclosure provides a lower vehicle-body structure of an electric vehicle that uses output from a rotary electric machine as a drive force, including a pair of left and right side sills extending in a vehicle front-rear direction; a substantially flat floor panel disposed between the side sills; and a floor cross member disposed on an upper surface of the floor panel between a front seat and a rear seat on which occupants sit, and connecting the left and right side sills in a vehicle width direction at a height lower than a height from the floor panel to an upper surface of each side sill. The floor cross member includes, in a vertical section along the vehicle-width direction, an upper enlarged section with a section enlarged toward a vehicle upper side substantially at a middle in the vehicle-width direction so that an upper surface of the upper enlarged section is located on the vehicle upper side with respect to upper surfaces near ends of the floor cross member in the vehicle width direction. The substantially flat floor panel is a floor panel including no tunnel protruding toward the vehicle upper side and extending in the vehicle front-rear direction.

The second aspect of present disclosure can ensure both space under occupant's feet and desired resistance to lateral collision. Specifically, the floor cross member disposed between the front seat and the rear seat is at the height lower than the height from the floor panel to the upper surface of each side sill. Thus, the lower vehicle-body structure of the electric vehicle can ensure larger space under feet of an occupant sitting on the rear seat as compared to when using a floor cross member at substantially the same height as the height from the floor panel to the upper surface of each side sill.

Further, the floor cross member includes the upper enlarged section. Thus, the lower vehicle-body structure of the electric vehicle can increase rigidity of the floor cross member, which is long in the vehicle width direction, substantially at the middle in the vehicle-width direction. Therefore, the lower vehicle-body structure of the electric vehicle can increase rigidity of a vehicle cabin floor against a collision load from a vehicle lateral side. Thus, the lower vehicle-body structure of the electric vehicle can prevent, for example, the floor panel from being buckled and deformed or bent and deformed substantially at the middle in the vehicle-width direction when the lateral collision load is applied from the vehicle lateral side.

Therefore, the lower vehicle-body structure of the electric vehicle can ensure both space under occupant's feet and desired resistance to lateral collision. Particularly, the floor cross member may include a cross member body connecting the left and right side sills and forming, together with the floor panel, a closed cross-section extending in the vehicle width direction, and a cross member reinforcing element secured to the cross member body and forming the upper enlarged section, and the cross member body may have an upper surface with a substantially rectangular flat shape in plan view. According to the above lower-vehicle-body structure, the lower vehicle-body structure of the electric vehicle can form substantially linear ridges along a front end and a rear end of the upper surface of the cross member body. Thus, the lower vehicle-body structure of the electric vehicle can efficiently transfer the collision load from the vehicle lateral side from one side sill to the other side sill via the floor cross member.

Therefore, the lower vehicle-body structure of the electric vehicle can ensure stable resistance to lateral collision without reducing space under occupant's feet. Particularly, the lower vehicle-body structure of the electric vehicle may include a pair of left and right floor frames disposed on the floor panel and extending near the side sills in the vehicle front-rear direction, the cross member body may include a member middle portion located between the floor frames, and a pair of left and right member end portions located at opposite ends of the member middle portion in the vehicle width direction, and the member middle portion may be formed of one member having higher rigidity than the member end portions. According to the above lower-vehicle-body structure, the lower vehicle-body structure of the electric vehicle can increase rigidity of the vehicle cabin floor between the left and right floor frames and thus ensure more stable resistance to lateral collision.

Specifically, the member end portions of the floor cross member are located between the floor frames and the side sills. Thus, the lower vehicle-body structure of the electric vehicle can distribute and transfer the collision load applied from the vehicle lateral side to the side sills, to the floor frames and the member middle portion of the floor cross member via the member end portions of the floor cross member. In this case, rigidity of the member end portions is lower than rigidity of the member middle portion. Thus, the lower vehicle-body structure of the electric vehicle can absorb the collision load from the vehicle lateral side by deformation of the member end portions. Thus, the lower vehicle-body structure of the electric vehicle can reduce the lateral collision load applied from the vehicle lateral side to the member middle portion.

Therefore, the lower vehicle-body structure of the electric vehicle can increase rigidity of the vehicle cabin floor between the left and right floor frames and thus ensure more stable resistance to lateral collision. Particularly, the cross member reinforcing element may be joined to the floor panel with a lower end of the cross member body being interposed between the cross member reinforcing element and the floor panel in a vertical section along the vehicle front-rear direction, and form a closed cross-section together with the cross member body.

According to the above lower-vehicle-body structure, the lower vehicle-body structure of the electric vehicle can increase rigidity of the floor cross member substantially at the middle in the vehicle-width direction. Thus, the lower vehicle-body structure of the electric vehicle can ensure more stable resistance to lateral collision without reducing space under occupant's feet. Particularly, an upper surface of the cross member reinforcing element may include, at opposite ends in the vehicle width direction, seat securing portions to which rear legs of the front seat are secured, and the seat securing portions may be formed substantially in the same position in the vehicle up-down direction as the substantial middle of an upper surface of the upper enlarged section in the vehicle-width direction in the vertical section along the vehicle width direction.

According to the above lower-vehicle-body structure, the lower vehicle-body structure of the electric vehicle can form substantially linear ridges along a front end and a rear end of the upper surface of the cross member reinforcing element even when the seat securing portions are provided. Thus, the lower vehicle-body structure of the electric vehicle can more efficiently transfer the collision load from the vehicle lateral side from one side sill to the other side sill via the floor cross member. Further, the lower vehicle-body structure of the electric vehicle can reduce irregularities in the upper surface of the cross member reinforcing element in the vehicle up-down direction, and thus can reduce the height of the floor cross member and improve formability of the cross member reinforcing element.

Thus, the lower vehicle-body structure of the electric vehicle can ensure space under occupant's feet, stable resistance to lateral collision, and formability of the floor cross member. Particularly, the lower vehicle-body structure of the electric vehicle may include an elongated member that is long in the vehicle front-rear direction and has a front part and a rear part connected to a vehicle body, the elongated member may include a pair of left and right side walls facing each other in the vehicle width direction and have a substantially inverted U-shaped vertical section along the vehicle width direction, and the side walls of the elongated member may be secured to the upper enlarged section of the floor cross member. The long member is, for example, a support member that supports a center console, a support member that supports a shift lever, or a load transfer member that transfers a load in the vehicle front-rear direction.

According to the above lower-vehicle-body structure, the lower vehicle-body structure of the electric vehicle can prevent an increase in weight and ensure much more stable resistance to lateral collision. Specifically, the upper enlarged section of the floor cross member that is long in the vehicle width direction can be supported by the elongated member having the front part and the rear part connected to the vehicle body. Thus, the lower vehicle-body structure of the electric vehicle can increase rigidity of the floor cross member substantially at the middle in the vehicle-width direction.

Further, the side walls of the elongated member are secured to the upper enlarged section. Thus, the lower vehicle-body structure of the electric vehicle can distribute and transfer the lateral collision load applied from the vehicle lateral side to the floor cross member, in the vehicle front-rear direction via the elongated member. Thus, the lower vehicle-body structure of the electric vehicle can increase rigidity of the vehicle cabin floor against the lateral collision load from the vehicle lateral side.

In addition, the side walls of the elongated member are not secured to the floor panel. Thus, the lower vehicle-body structure of the electric vehicle can reduce a length of each side wall in the vehicle up-down direction as compared to when the side walls of the elongated member are secured to the floor panel. Thus, the lower vehicle-body structure of the electric vehicle can reduce weight of the elongated member as compared to when the side walls are secured to the floor panel. Therefore, the lower vehicle-body structure of the electric vehicle can prevent an increase in weight and ensure much more stable resistance to lateral collision. The second aspect of the present disclosure can provide a lower vehicle-body structure of an electric vehicle that can ensure both space under occupant's feet and desired resistance to lateral collision.

Further particularly, the third aspect of the present disclosure provides a lower vehicle-body structure of an electric vehicle in view of the problem that, for providing a console support bracket in International Publication No. WO2012/063393 and Japanese Patent Laid-Open No. 2013-147137, there is a room for improvement in terms of reduction in weight of the console support bracket. Then the third aspect of the present disclosure provides a lower vehicle-body structure of an electric vehicle that can increase resistance to lateral collision, and also reduce weight of a console support bracket and increase support rigidity of the console support bracket.

The third aspect of the present disclosure provides a lower vehicle-body structure of an electric vehicle including: a floor panel that forms a vehicle cabin floor; a floor cross member disposed below a front part of a front seat to linearly extend in a vehicle width direction between a pair of left and right side sills at a height of the side sills above the floor panel; and a console support bracket that is disposed above a middle of the floor cross member and supports a console. An upper enlarged section with a section enlarged upward to a height of the console support bracket is provided on a middle upper part of the floor cross member. According to this configuration, the floor cross member linearly extends in the vehicle width direction between the pair of left and right side sills at the height of the side sills. This can increase resistance to lateral collision.

The upper enlarged section with the section enlarged upward to the height of the console support bracket is provided on the middle upper part of the floor cross member. This can increase resistance to lateral collision, eliminate the need to extend a lower end of the console support bracket downward to the floor panel, and thus reduce weight of the console support bracket and increase support rigidity of the console support bracket. Particularly, the console support bracket includes an upper wall and left and right side walls and has an inverted U-shape, and the side walls of the console support bracket are secured to the upper enlarged section.

According to this configuration, the height of the side walls of the console support bracket can be reduced by a vertical height of the floor cross member and a vertical height of the upper enlarged section, thereby reducing weight of the console support bracket. Particularly, an upper surface of the floor cross member is substantially linearly formed in the vehicle width direction, and the upper enlarged section is formed by a cross member reinforcing element separate from the floor cross member.

According to this configuration, the upper enlarged section is formed separately from the floor cross member. This can form linear ridges as basic parts of the floor cross member and increase resistance to lateral collision. Particularly, left and right floor frames extending in a vehicle front-rear direction are provided below the floor panel, and a part of the floor cross member between the left and right floor frames has higher rigidity than parts located on vehicle-width-direction outer sides of the floor frames, and is formed of one member. The parts located on the vehicle-width-direction outer sides of the floor frames may be formed of a high tensile steel plate having a thickness of 1.0 mm, and the part of the floor cross member between the left and right floor frames may be formed of an ultrahigh tensile steel plate having a thickness of 1.8 mm.

According to this configuration, lateral collision energy is absorbed by the outer parts of the floor cross member located on the vehicle-width-direction outer sides of the floor frames, and the part of the floor cross member between the left and right floor frames, that is, the basic part is formed of one member, thereby increasing resistance to lateral collision. Particularly, securing portions for the front part of the front seat are formed on opposite sides of the upper enlarged section in the vehicle width direction at the same height as the upper enlarged section.

This configuration can form linear ridges of the upper enlarged section in the vehicle width direction, increase resistance to lateral collision, and also improve formability of the cross member reinforcing element. Particularly, a shift lever support bracket is mounted to the console support bracket above the floor cross member, and a reinforcing support bracket that supports an upper surface of the console support bracket from below fixedly stands on an upper surface of the cross member reinforcing element.

According to this configuration, providing the reinforcing support bracket can increase rigidity of the upper enlarged section in the up-down direction. Particularly, the shift lever support bracket is mounted to the console support bracket at left and right, and the reinforcing support bracket has an M-shaped section in front view of the vehicle.

According to this configuration, forming the reinforcing support bracket to have the M-shaped section can increase rigidity of the reinforcing support bracket itself and thus increase rigidity of the shift lever support bracket between left and right support portions. Particularly, the reinforcing support bracket is mounted to the cross member reinforcing element together with the console support bracket.

According to this configuration, the cross member reinforcing element, the reinforcing support bracket, and the console support bracket are co-fastened, which can provide a large interval between support portions of the reinforcing support bracket and allow sharing of the support portions. The third aspect of the present disclosure can increase resistance to lateral collision, and also reduce weight of the console support bracket and increase support rigidity of the console support bracket.

DETAILED DESCRIPTION

The First Embodiment

Now, with reference to the drawings, an embodiment of the present disclosure will be described.

A vehicle in this embodiment is, for example, an electric vehicle that includes a battery unit such as a lithium ion secondary battery, and a rotary electric machine rotated by power supplied from the battery unit, and uses output from the rotary electric machine as a drive force. With reference to FIGS. 1 to 15, a lower vehicle-body structure in a vehicle interior part of such an electric vehicle 1 will be described in detail.

Figure 1:
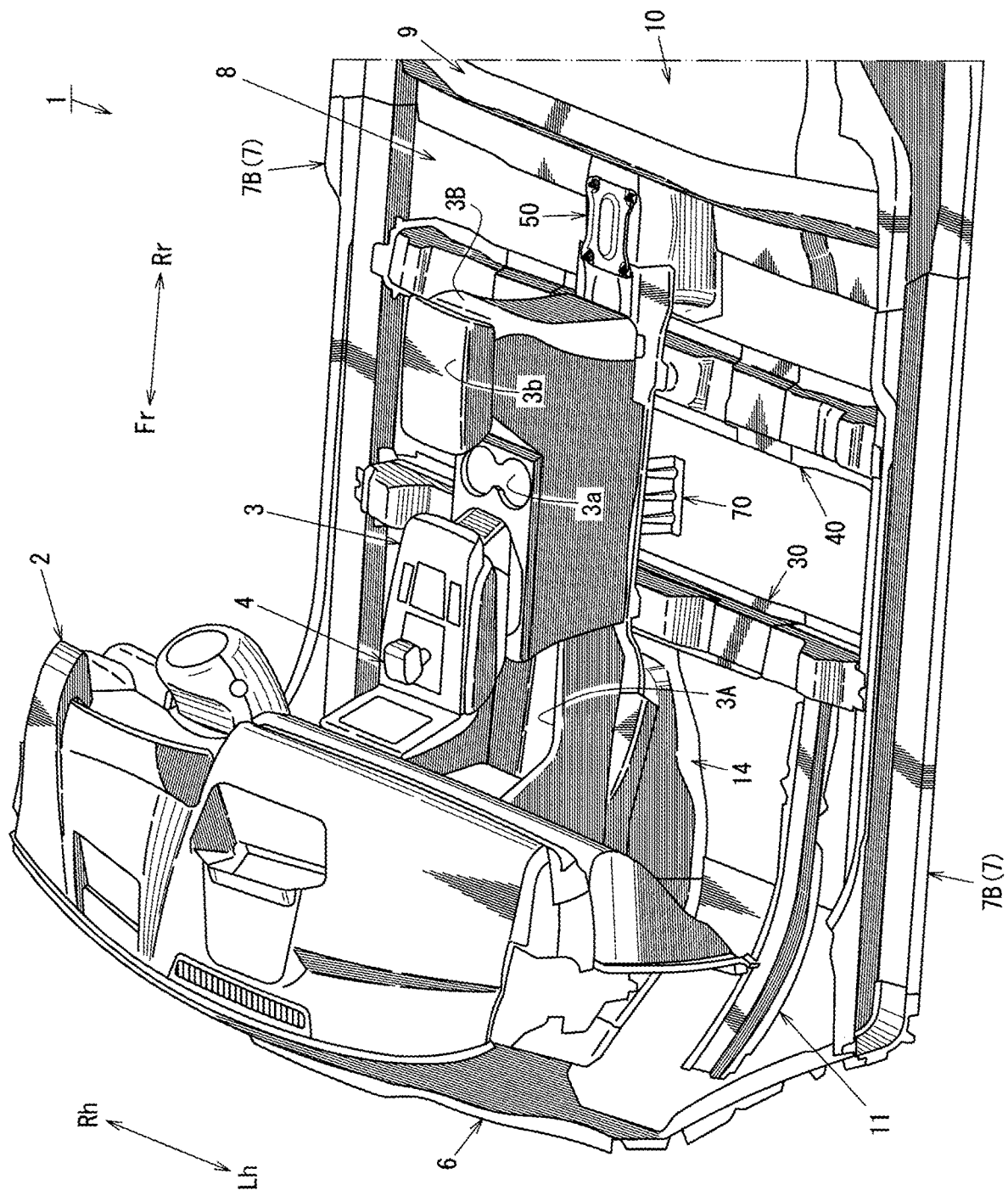
FIG. 1 is a perspective view of an appearance of a vehicle interior part of an electric vehicle.
Figure 2:
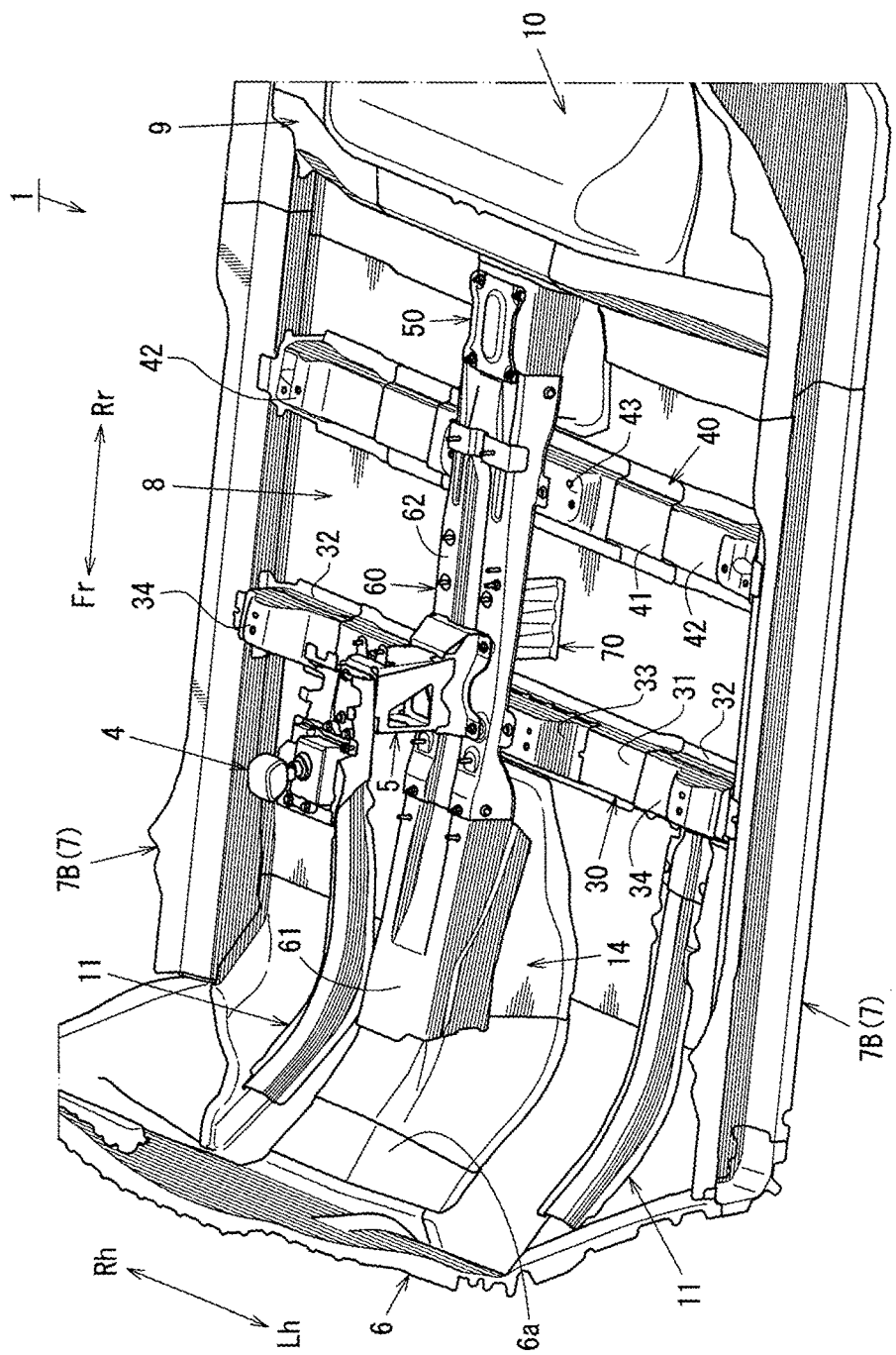
FIG. 2 is a perspective view of an appearance of a lower vehicle body of the electric vehicle.
Figure 3:
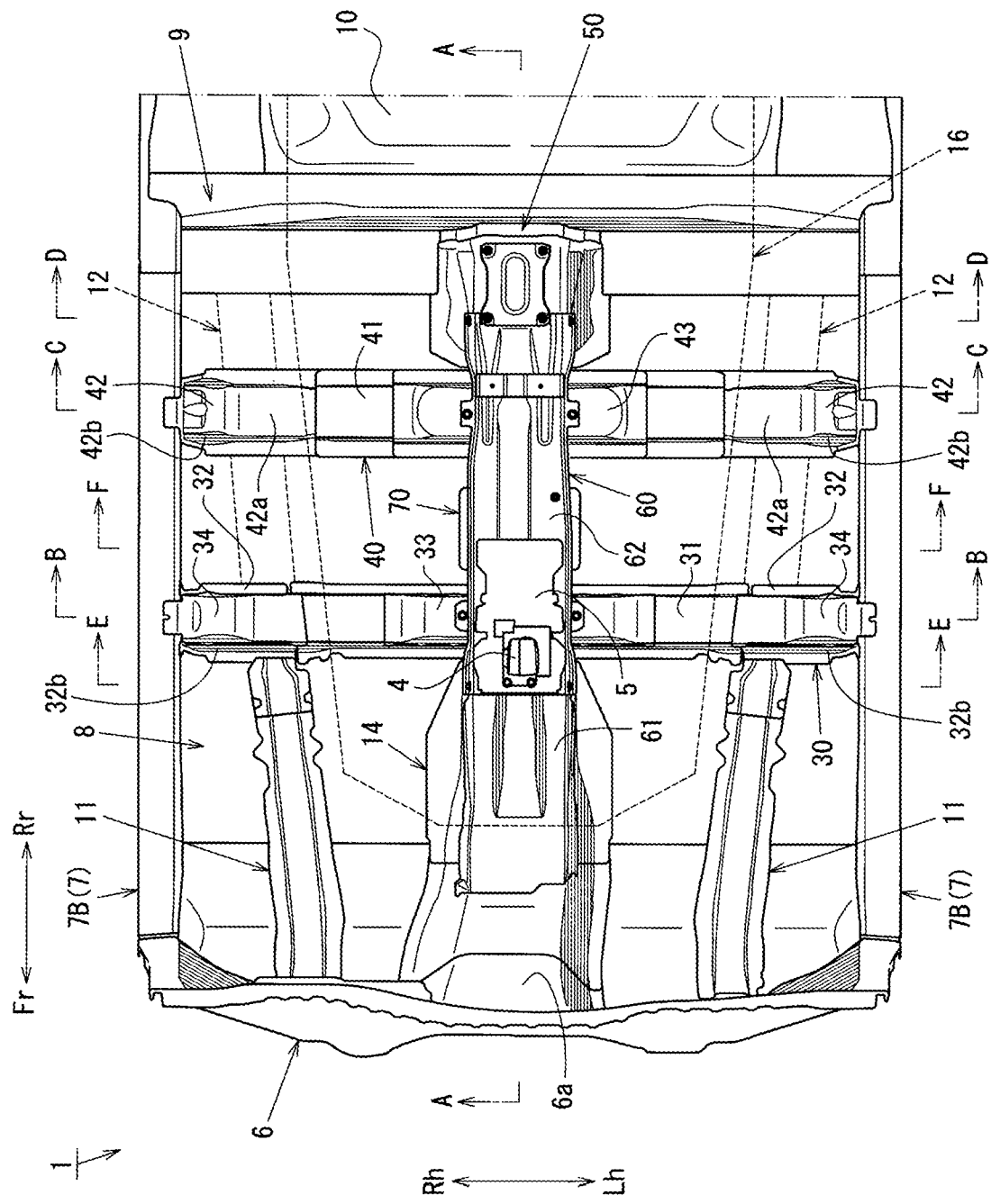
FIG. 3 is a plan view of an appearance of the lower vehicle body.
Figure 4:
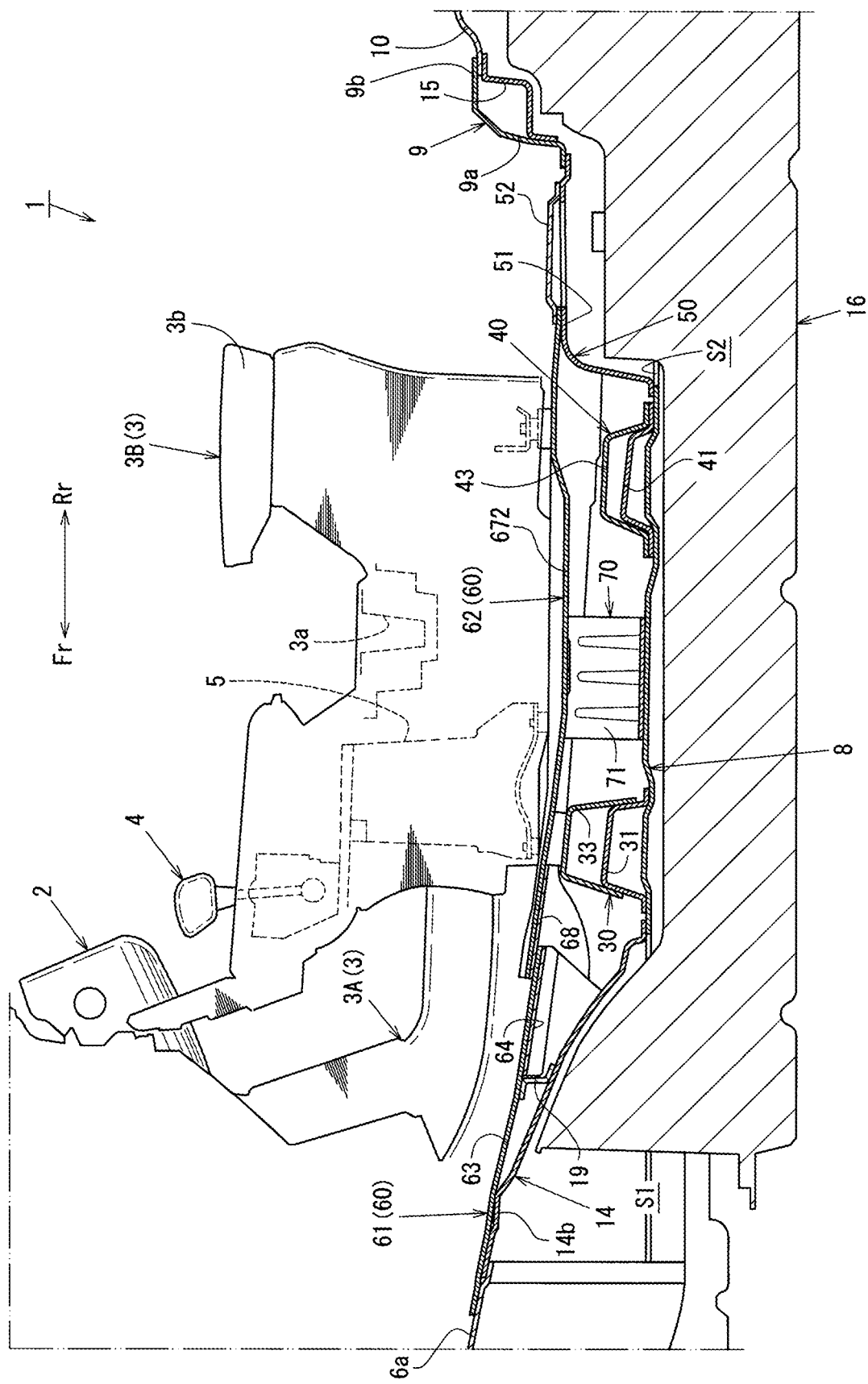
FIG. 4 is a sectional view taken in the direction of arrow A-A in FIG. 3.
Figure 5:
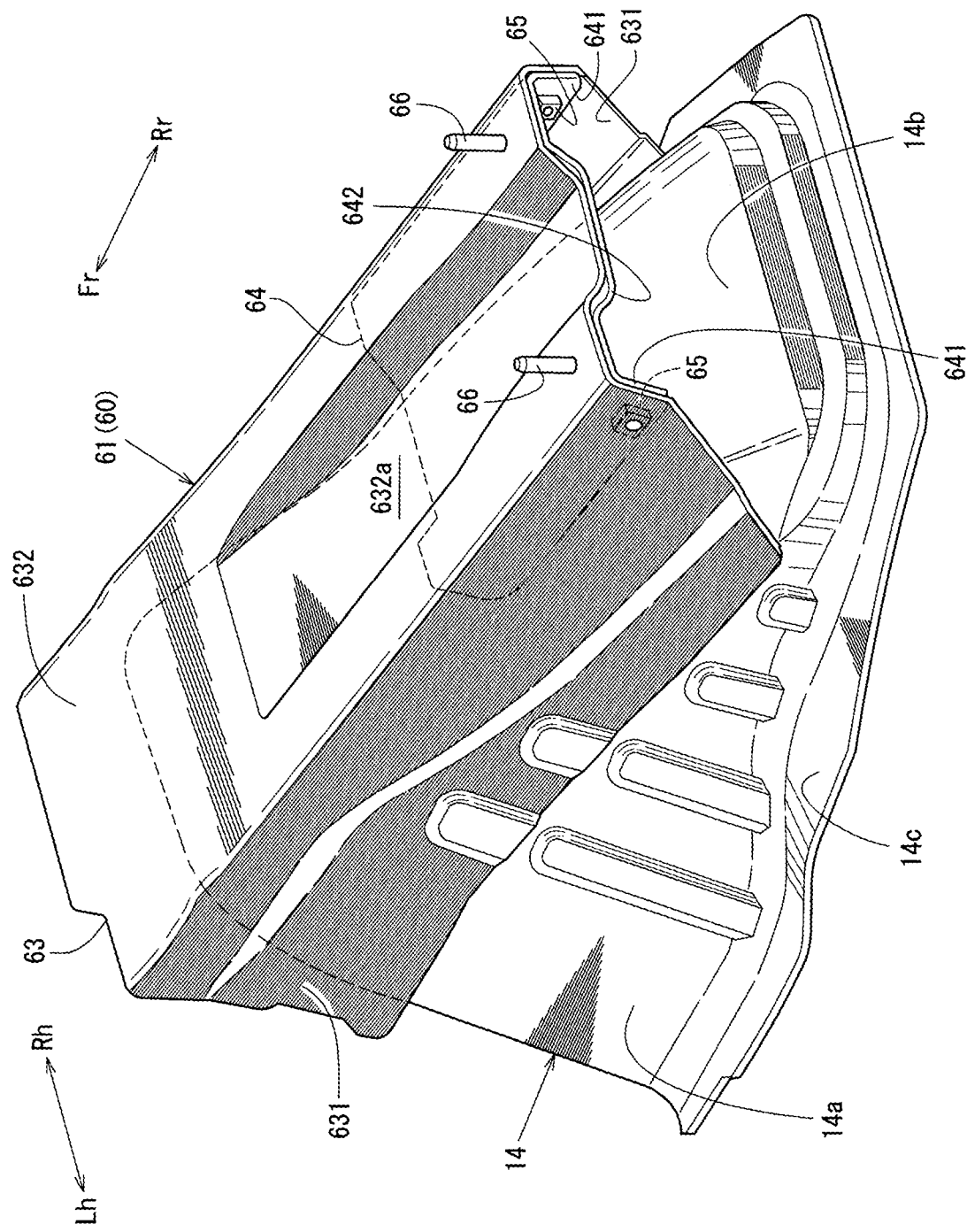
FIG. 5 is a perspective view of an appearance of an expanding member viewed from a vehicle rear side.

FIG. 1 is a perspective view of an appearance of a vehicle interior part of the electric vehicle 1, FIG. 2 is a perspective view of an appearance of a lower vehicle body of the electric vehicle 1, FIG. 3 is a plan view of the lower vehicle body, FIG. 4 is a sectional view taken in the direction of arrow A-A in FIG. 3, and FIG. 5 is a perspective view of an appearance of an expanding member 14 viewed from a vehicle rear side.

Figure 6:
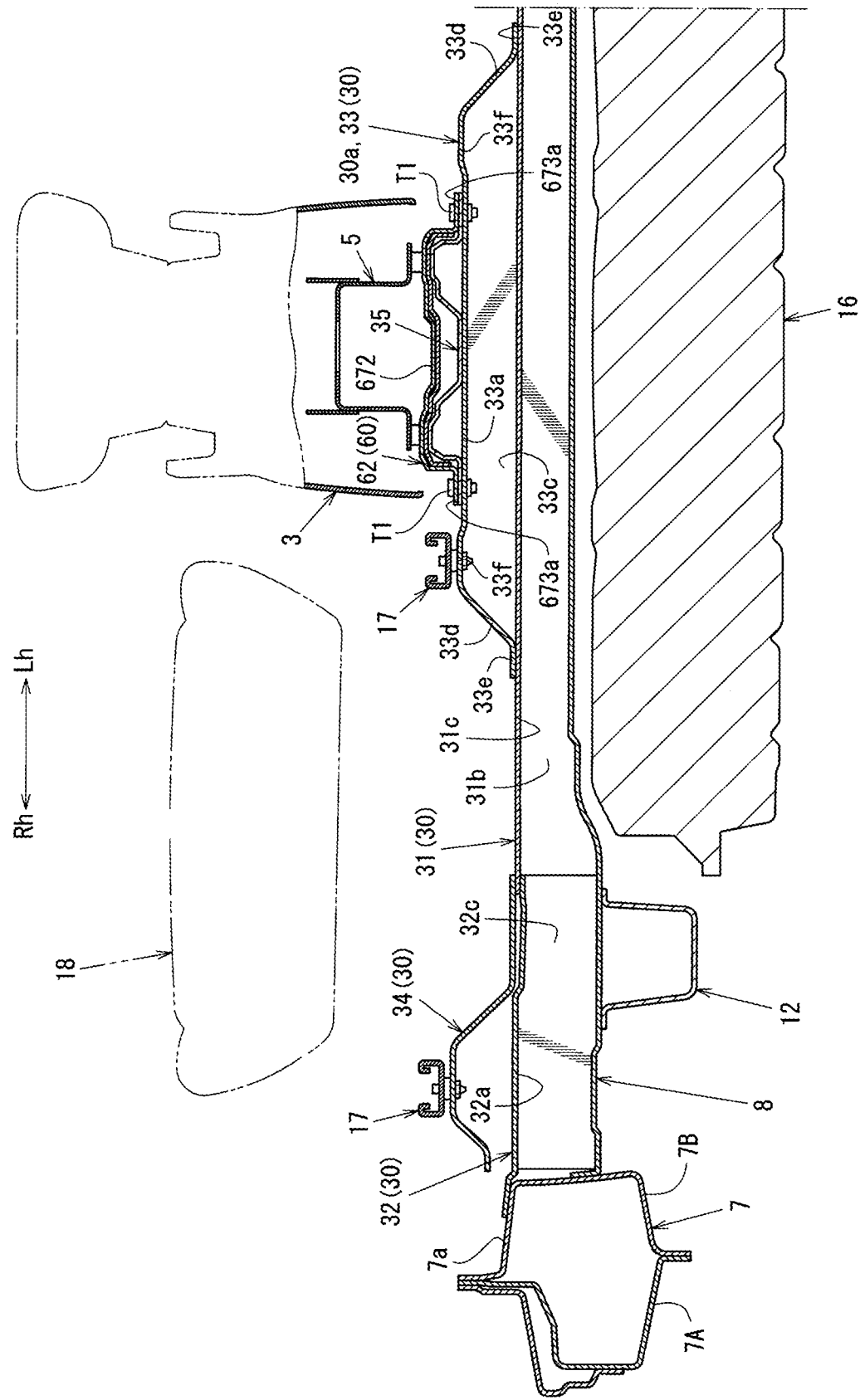
FIG. 6 is a sectional view taken in the direction of arrow B-B in FIG. 3.
Figure 7:
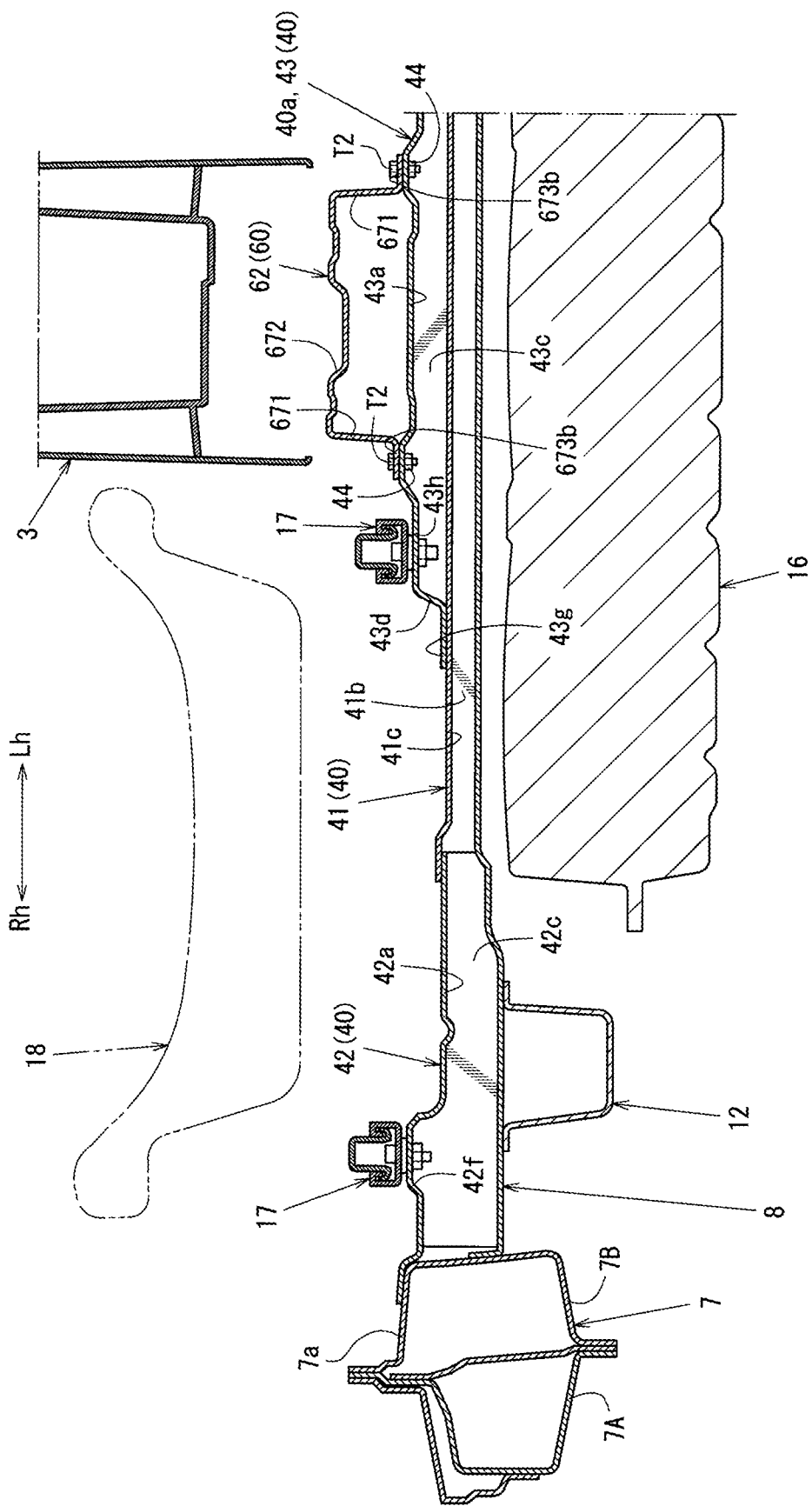
FIG. 7 is a sectional view taken in the direction of arrow C-C in FIG. 3.
Figure 8:
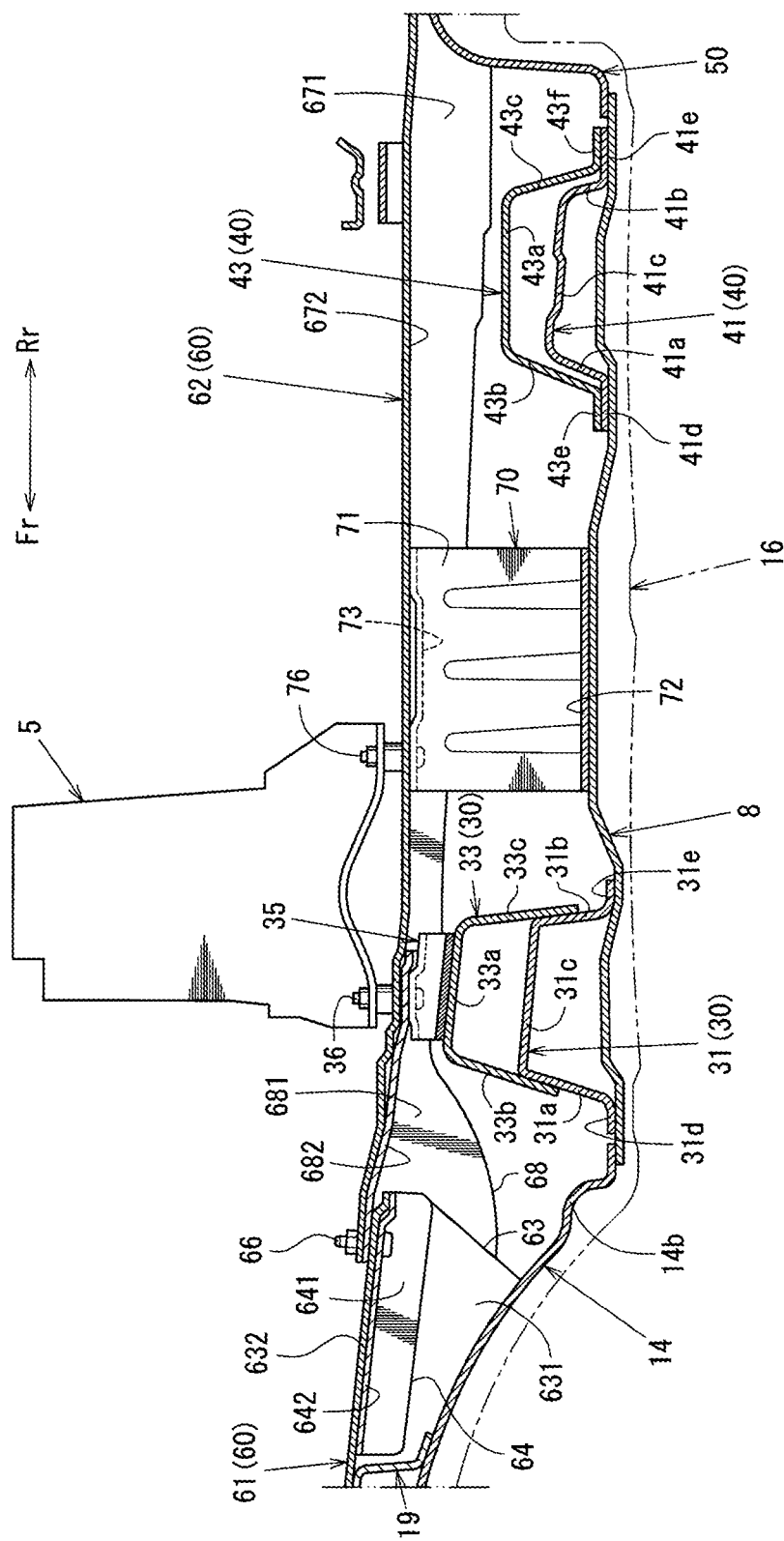
FIG. 8 is an enlarged sectional view of main portions on a vehicle front side in FIG. 4.
Figure 9:
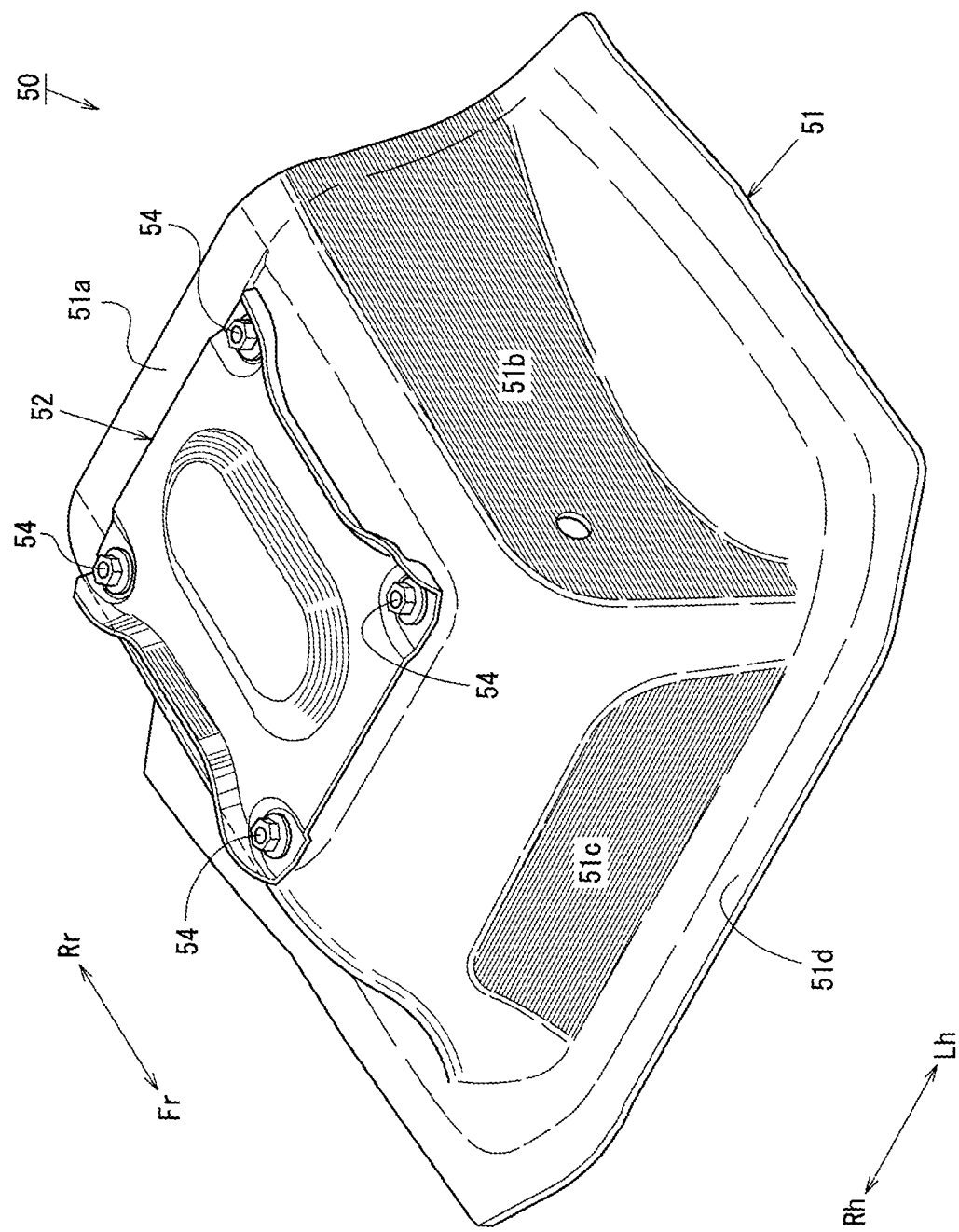
FIG. 9 is a perspective view of an appearance of a kick-up reinforcing element viewed from the vehicle front side.
Figure 10:
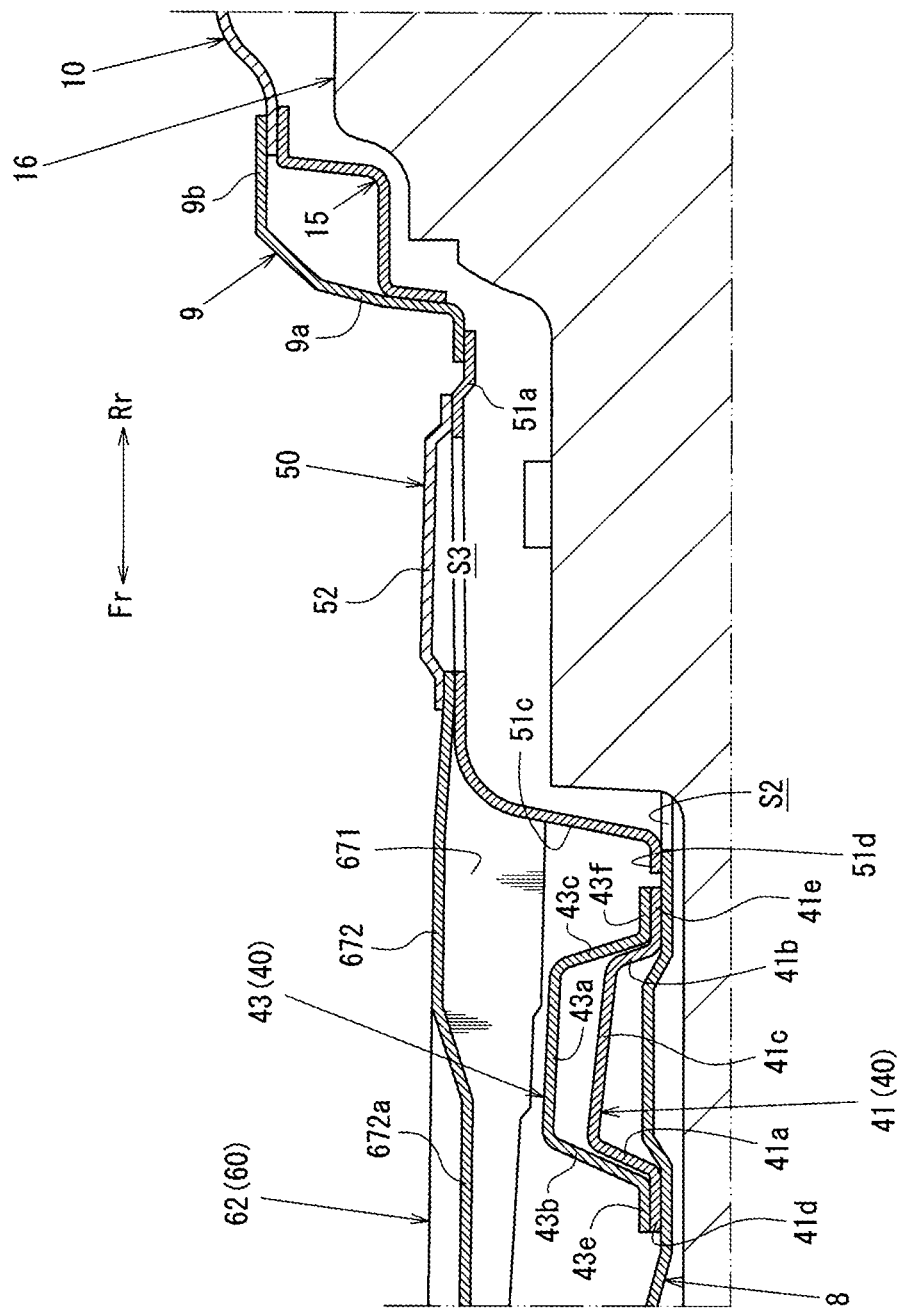
FIG. 10 is an enlarged sectional view of main portions on a vehicle rear side in FIG. 4.

Further, FIG. 6 is a sectional view taken in the direction of arrow B-B in FIG. 3, FIG. 7 is a sectional view taken in the direction of arrow C-C in FIG. 3, FIG. 8 is an enlarged sectional view of main portions on a vehicle front side in FIG. 4, FIG. 9 is a perspective view of an appearance of a kick-up reinforcing element 50 viewed from the vehicle front side, and FIG. 10 is an enlarged sectional view of main portions on the vehicle rear side in FIG. 4.

Figure 11:
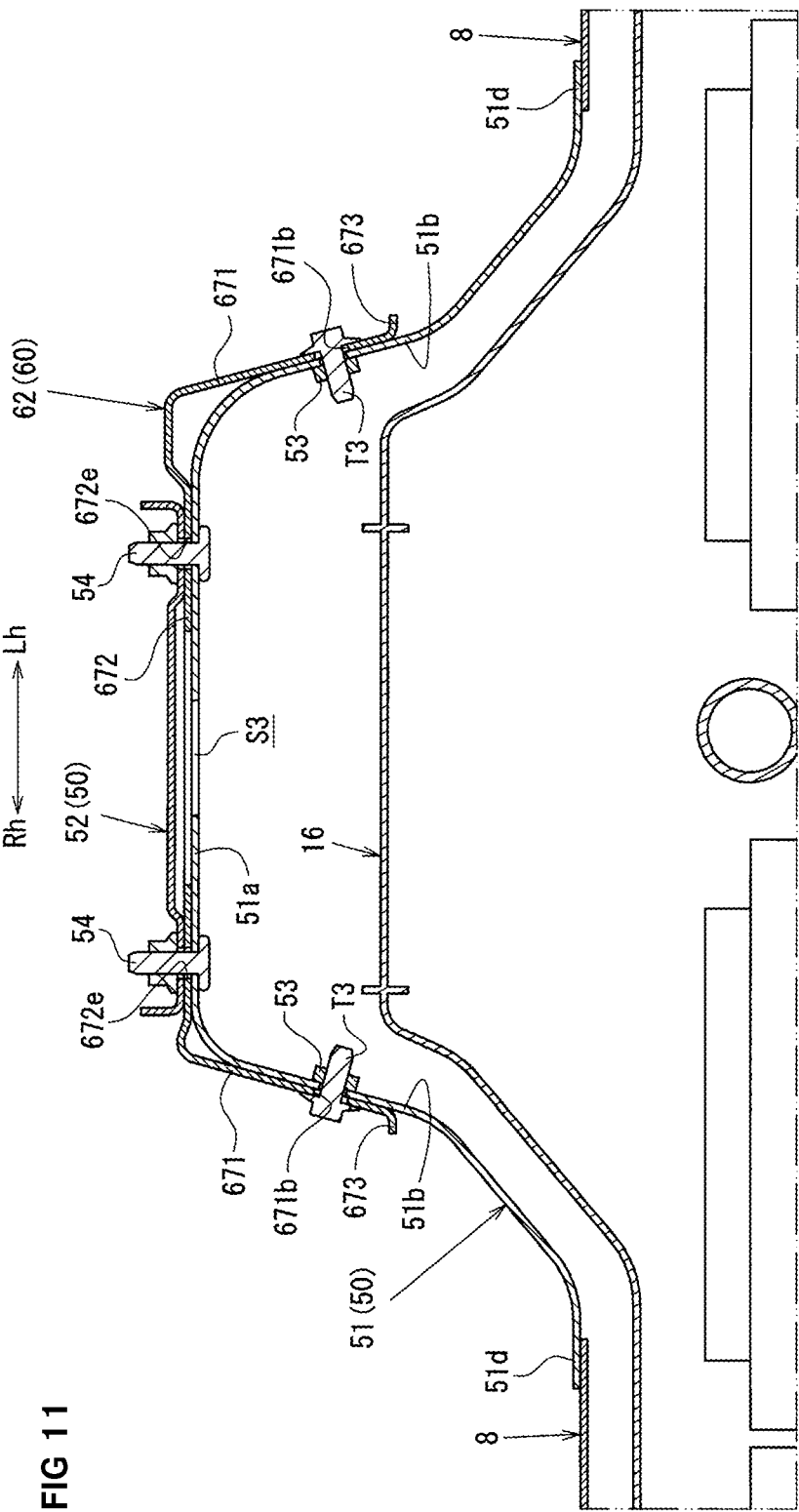
FIG. 11 is a sectional view taken in the direction of arrow D-D in FIG. 3.
Figure 12:
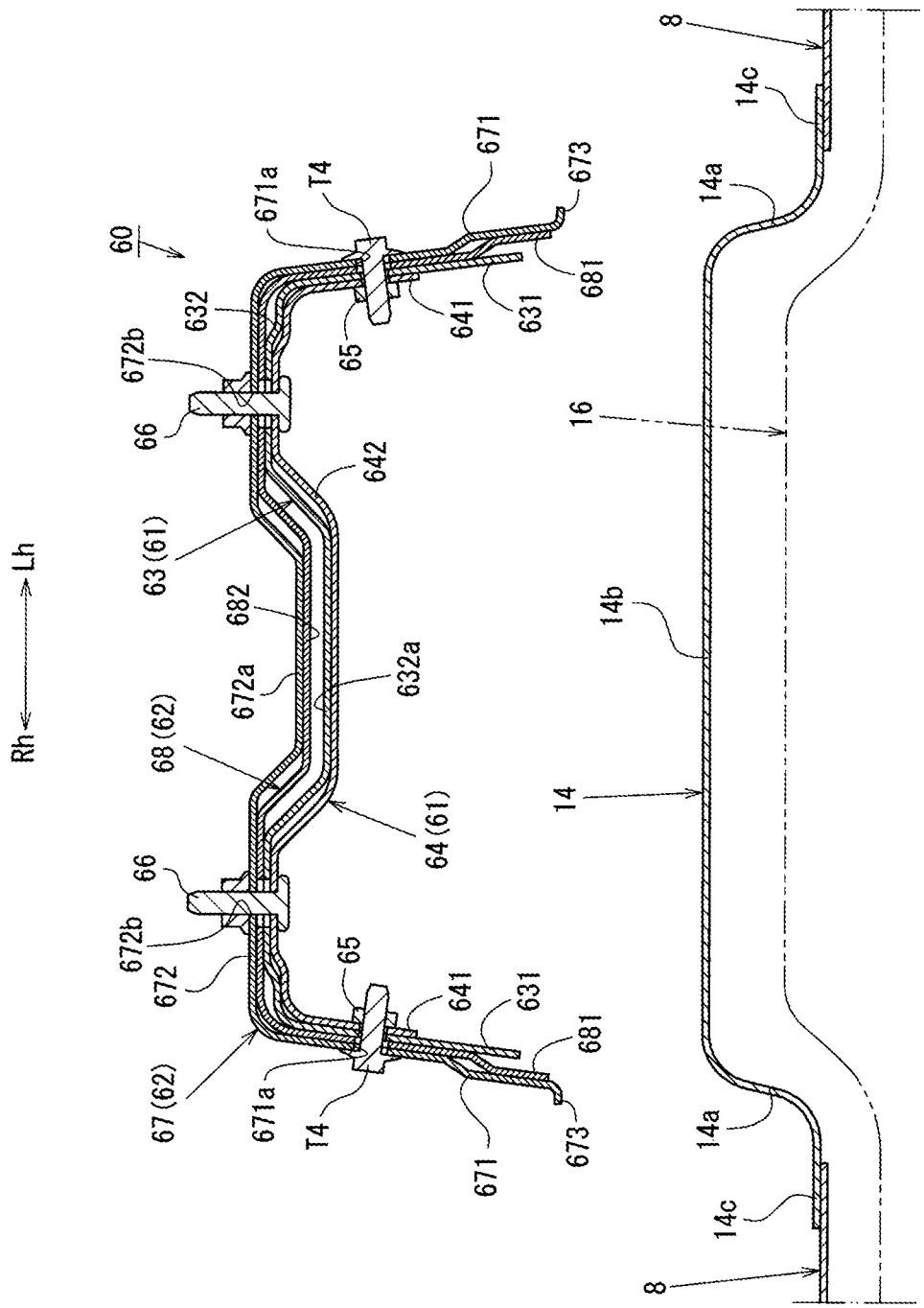
FIG. 12 is a sectional view taken in the direction of arrow E-E in FIG. 3.
Figure 13:
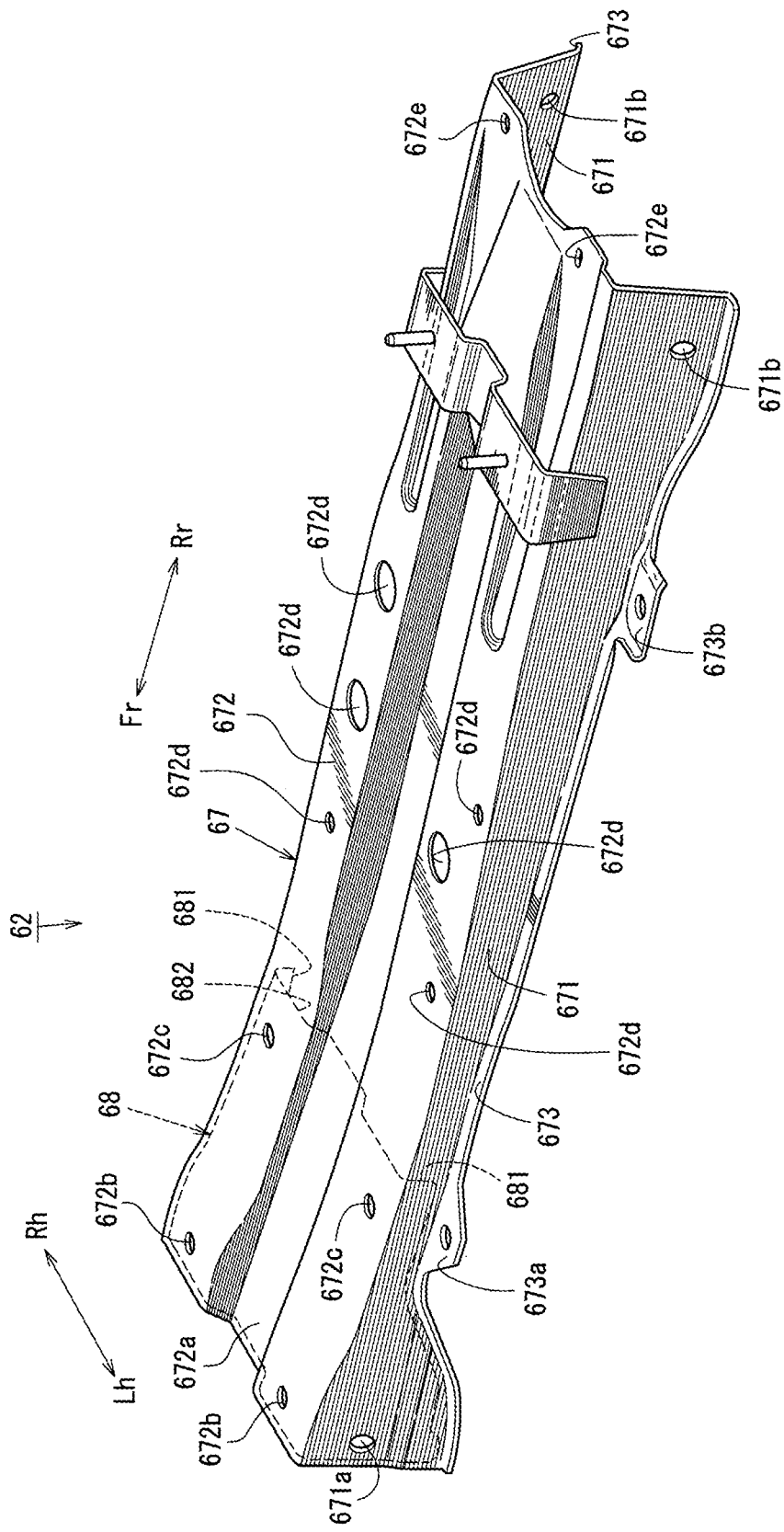
FIG. 13 is perspective view of an appearance of a second support bracket viewed from the vehicle rear side.
Figure 14:
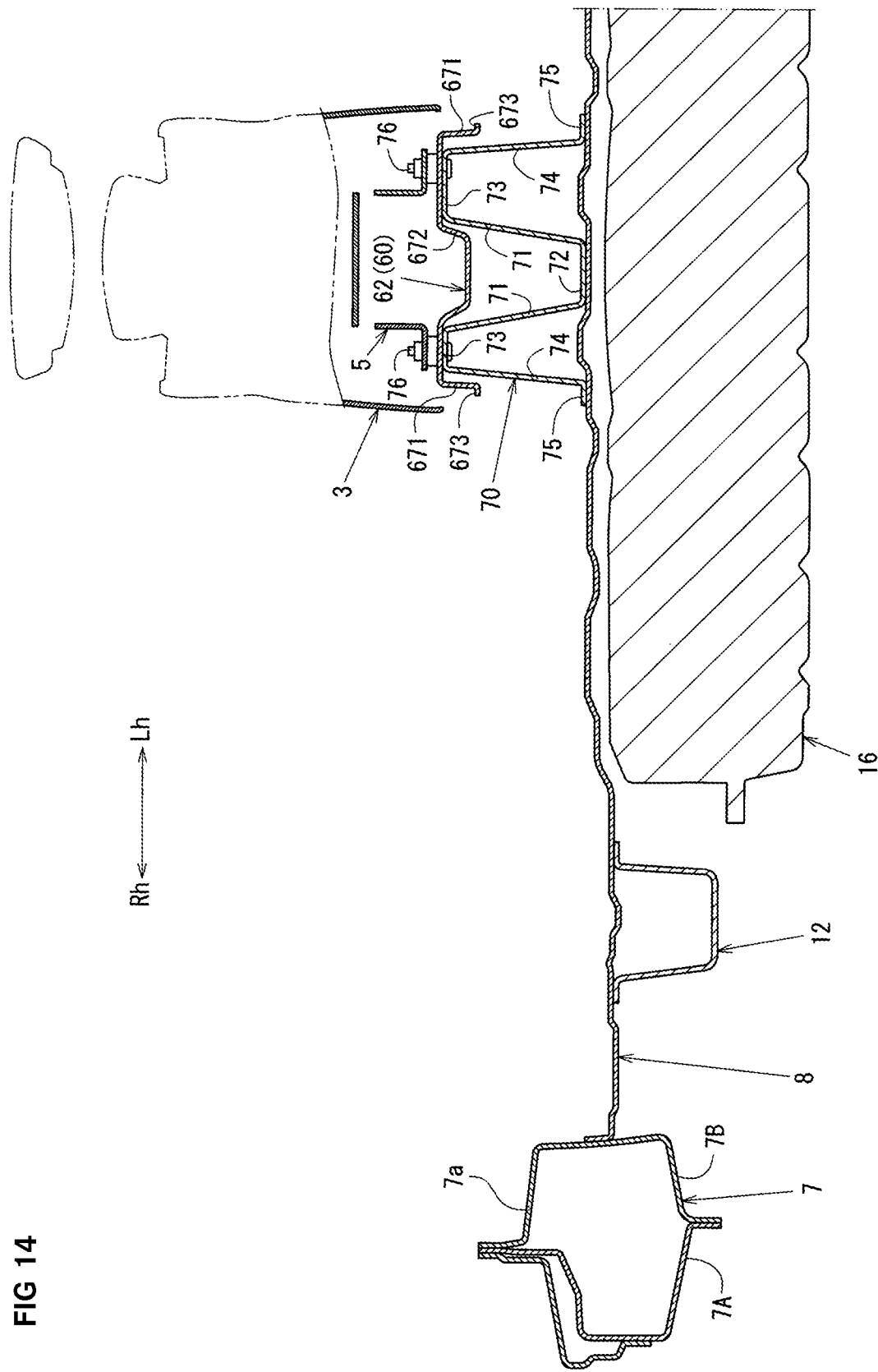
FIG. 14 is a sectional view taken in the direction of arrow F-F in FIG. 3.
Figure 15:
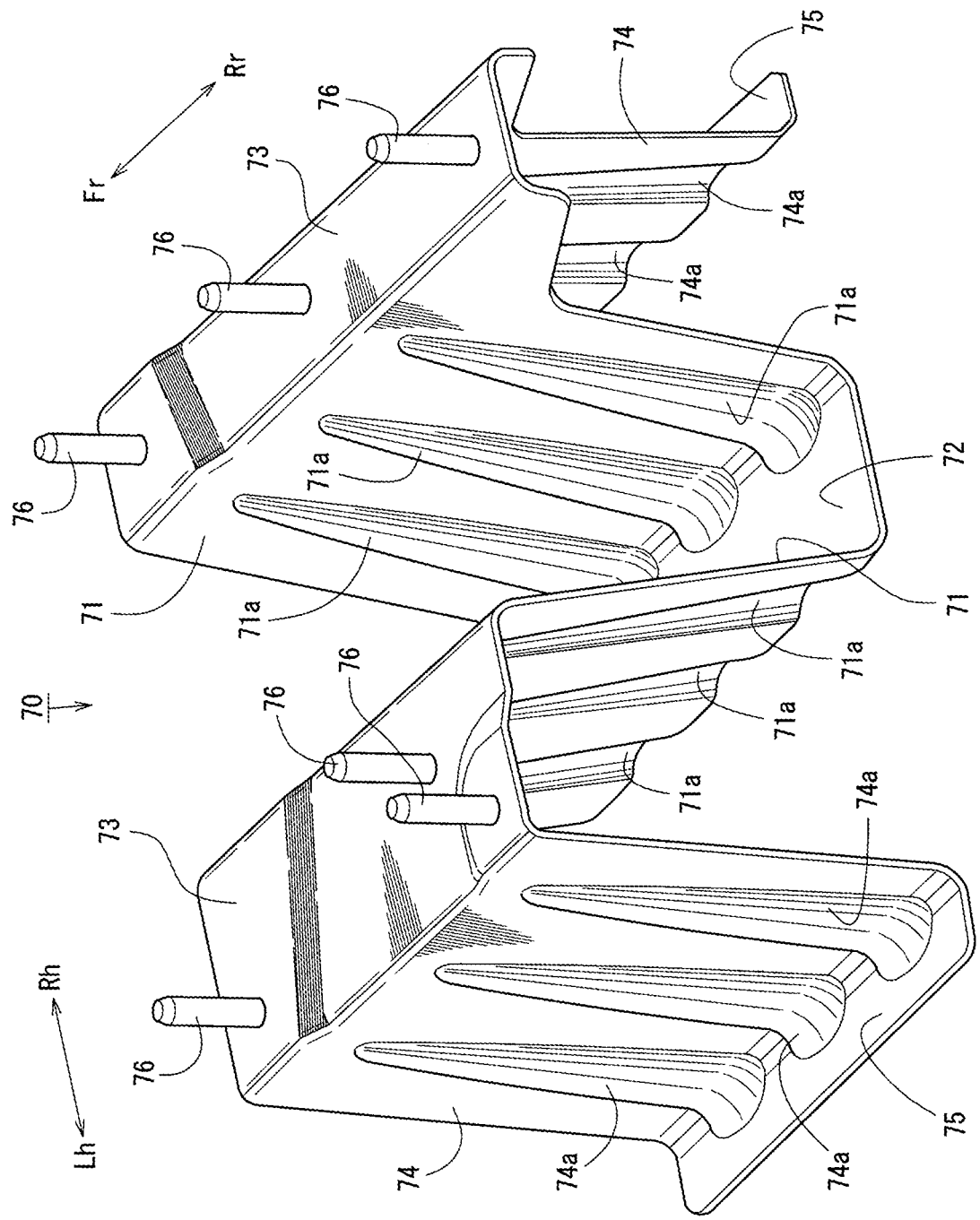
FIG. 15 is a perspective view of an appearance of a standing bracket viewed from the vehicle rear side.

In addition, FIG. 11 is a sectional view taken in the direction of arrow D-D in FIG. 3, FIG. 12 is a sectional view taken in the direction of arrow E-E in FIG. 3, FIG. 13 is a perspective view of an appearance of a second support bracket 62 viewed from the vehicle rear side, FIG. 14 is a sectional view taken in the direction of arrow F-F in FIG. 3; and FIG. 15 is a perspective view of an appearance of a standing bracket 70 viewed from the vehicle rear side.

For clear illustration, in FIGS. 1, 2, and 3, a side sill outer portion 7A is not shown, and in FIGS. 4, 6 to 8, 10, and 14, a battery unit 16 disposed on a vehicle lower side of a front floor panel 8 is not shown in detail.

In the drawings, arrows Fr and Rr show a front-rear direction, the arrow Fr shows a front side and the arrow Rr shows a rear side. Further, arrows Rh and Lh show a vehicle-width direction, the arrow Rh shows a right direction and the arrow Lh shows a left direction.

As shown in FIG. 1, in a vehicle interior of the electric vehicle 1, an instrument panel 2 is disposed in a vehicle interior front part, and a center console 3 and a shift lever 4 are disposed on the vehicle lower side substantially at a middle of the instrument panel 2 in the vehicle-width direction. Although not shown in detail, in the vehicle interior of the electric vehicle 1, two front seats are disposed with the center console 3 therebetween, and a rear seat is disposed on the vehicle rear side of the center console 3.

As shown in FIG. 1, the center console 3 include a center console front part 3A on the vehicle lower side of the instrument panel 2, and a center console rear part 3B connected to the vehicle rear side of the center console front part 3A. As shown in FIG. 1, the center console rear part 3B integrally includes a design panel covering a base of the shift lever 4, and on the vehicle rear side of the design panel, a cup holder 3a and an arm rest 3b are disposed in this order.

As shown in FIG. 2, the shift lever 4 is fixedly placed on a console support bracket 60 described later via a shift lever support bracket 5. The shift lever support bracket 5 has a front part fastened to an upper surface of a first floor cross member 30 described later, and a rear part fastened to an upper surface of a standing bracket 70 described later.

As shown in FIGS. 1 and 2, the lower vehicle body in the vehicle interior part of the electric vehicle 1 includes a dash panel 6 that divides a motor room from the vehicle interior in a vehicle front-rear direction, a pair of left and right side sills 7 extending toward the vehicle rear side from lower parts of opposite ends of the dash panel 6 in the vehicle-width direction, a front floor panel 8 that is disposed between the left and right side sills 7 and forms a vehicle interior floor surface, a kick-up portion 9 raised from a rear end of the front floor panel 8 toward a vehicle upper side, and a rear floor panel 10 connected a rear end of the kick-up portion 9.

Further, as shown in FIGS. 1 and 2, the lower vehicle body of the electric vehicle 1 includes a pair of left and right floor frame upper portions 11 extending across the dash panel 6 and the front floor panel 8 in the vehicle front-rear direction, a pair of left and right floor frame lower portions 12 (see FIG. 3) extending from a rear end of the floor frame upper portion 11 toward the vehicle rear side, and a first floor cross member 30 and a second floor cross member 40 connecting the left and right side sills 7 in the vehicle-width direction.

In addition, as shown in FIGS. 1 and 2, the lower vehicle body of the electric vehicle 1 includes a kick-up reinforcing element 50 that connects a portion near the rear end of the front floor panel 8 and the kick-up portion 9, the console support bracket 60 that supports the shift lever 4 and the center console 3, and the standing bracket 70 that supports the console support bracket 60 from the vehicle lower side.

Specifically, the dash panel 6 is a panel member having a thickness in the vehicle front-rear direction, and has a lower part curved toward the vehicle rear side. As shown in FIGS. 2 to 4, the dash panel 6 has, substantially at the middle in the vehicle-width direction, a tunnel-shaped portion 6a expanding like a tunnel extending from a vehicle front upper side toward a vehicle rear lower side. The tunnel-shaped portion 6a is formed of a separate member covering an opening that is cut substantially at the middle of the dash panel 6 in the vehicle-width direction, and joined to the dash panel 6 and thus integrated with the dash panel 6.

The left and right side sills 7 each form a substantially rectangular closed vertical section along the vehicle-width direction (see FIG. 6). More specifically, the side sill 7 includes a side sill outer portion 7A (see FIG. 6) having a substantially hat-shaped vertical section along the vehicle-width direction that protrudes toward a vehicle-width-direction outer side, and a side sill inner portion 7B (see FIG. 6) having a substantially hat-shaped vertical section along the vehicle-width direction that protrudes toward a vehicle-width-direction inner side.

As shown in FIGS. 2 to 4, the front floor panel 8 is a substantially flat panel member having a thickness in a vehicle up-down direction, and has a front end joined to a lower end of the dash panel 6 and a rear end joined to a lower end of the kick-up portion 9 described later.

As shown in FIG. 4, in a front part of the front floor panel 8, a front opening S1 is formed that is cut continuously with an internal space of the tunnel-shaped portion 6a of the dash panel 6 substantially at the middle in the vehicle-width direction. On the other hand, as shown in FIG. 4, in a rear part of the front floor panel 8, a rear opening S2 is formed that is cut continuously with an internal space of the kick-up reinforcing element 50 described later substantially at the middle in the vehicle-width direction.

As shown in FIGS. 2 to 4, to the front floor panel 8, an expanding member 14 is joined that covers the front opening S1 and expands toward the vehicle upper side continuously with the tunnel-shaped portion 6a of the dash panel 6. The expanding member 14 has a length in the vehicle front-rear direction from a front end of the front floor panel 8 to a front end of the first floor cross member 30 described later.

More specifically, as shown in FIGS. 4 and 5, the expanding member 14 includes a pair of left and right side walls 14a facing each other in the vehicle-width direction to form a substantially triangular shape in side view, a rear wall 14b inclined so that a rear end is located on the vehicle lower side with respect to a front end, and a flange 14c along lower ends of the side walls 14a and a lower end of the rear wall 14b, and has a substantially box shape opening on the vehicle front side and the vehicle lower side.

The expanding member 14 forms a substantially tunnel-shaped space continuous with the tunnel-shaped portion 6a of the dash panel 6 by front parts of the side walls 14a and a front part of the rear wall 14b being joined to the tunnel-shaped portion 6a of the dash panel 6 and the flange 14c being joined to an upper surface of the front floor panel 8.

As shown in FIGS. 2 to 4, the kick-up portion 9 includes a kick-up front surface 9a extending from the rear end of the front floor panel 8 toward the vehicle upper side, and a kick-up upper surface 9b extending from an upper end of the kick-up front surface 9a toward the vehicle rear side, and has a substantially L-shaped vertical section along the vehicle front-rear direction.

As shown in FIG. 4, to a lower surface of the kick-up portion 9, a third cross member 15 extending in the vehicle-width direction is joined across an upper part of the kick-up front surface 9a and a front part of the kick-up upper surface 9b. The third cross member 15 has a substantially L-shaped vertical section along the vehicle front-rear direction with a corner on the vehicle rear lower side, and forms, together with the kick-up portion 9, a substantially rectangular closed section extending in the vehicle-width direction.

The rear floor panel 10 is a panel member having a thickness in the vehicle up-down direction, and joined to a rear end of the kick-up upper surface 9b of the kick-up portion 9. Although not shown in detail, a rear seat surface is fixedly placed on an upper surface of the rear floor panel 10.

As shown in FIGS. 2 and 3, each floor frame upper portion 11 is disposed across a vehicle interior inner side of a lower part of the dash panel 6 and an upper surface of the front floor panel 8. Although not shown in detail, the floor frame upper portion 11 has a substantially hat-shaped vertical section along the vehicle-width direction protruding toward the vehicle upper side, and is joined to the dash panel 6 and the front floor panel 8 to form a substantially rectangular closed section extending in the vehicle front-rear direction.

As shown in FIG. 3, the floor frame upper portion 11 is disposed near the vehicle-width-direction outer side to extend near the side sill 7 in plan view, and has a rear end located on the vehicle-width-direction outer side with respect to a front end.

As shown in FIG. 3, each floor frame lower portion 12 is disposed on a lower surface of the front floor panel 8 continuously with the floor frame upper portion 11 in plan view. More specifically, as shown in FIG. 3, the floor frame lower portion 12 has a rear end located on the vehicle-width-direction outer side with respect to a front end. In other words, the floor frame lower portions 12 are disposed to extend near the left and right side sills 7.

As shown in FIG. 6, the floor frame lower portion 12 has a substantially hat-shaped vertical section along the vehicle-width direction protruding toward the vehicle lower side, and is joined to the lower surface of the front floor panel 8 to form a substantially rectangular closed section extending in the vehicle front-rear direction.

As shown in FIGS. 3 and 4, between the floor frame lower portions 12 on the vehicle lower side of the front floor panel 8, a battery unit 16 that supplies power to the rotary electric machine is disposed in an area from a portion near the front end of the front floor panel 8 to the rear floor panel 10.

As shown in FIGS. 2 and 3, the first floor cross member 30 substantially linearly connects the left and right side sills 7 in a position adjacent, on the vehicle rear side, to the rear end of the expanding member 14 on the front floor panel 8. As shown in FIG. 4, the first floor cross member 30 forms, together with the front floor panel 8, a closed vertical section along the vehicle front-rear direction that extends in the vehicle-width direction.

Further, as shown in FIG. 6, the first floor cross member 30 has, in a vertical section along the vehicle-width direction, an upper enlarged section 30a with a section enlarged toward the vehicle upper side substantially at the middle in the vehicle-width direction so that an upper surface of the first floor cross member 30 substantially at the middle in the vehicle-width direction is located on the vehicle upper side with respect to the upper surface on the vehicle-width-direction outer side.

As shown in FIGS. 2 and 3, the second floor cross member 40 substantially linearly connects the left and right side sills 7 at a predetermined distance from the first floor cross member 30 on the vehicle rear side. As shown in FIG. 4, the second floor cross member 40 forms, together with the front floor panel 8, a closed vertical section along the vehicle front-rear direction that extends in the vehicle-width direction.

Further, as shown in FIG. 7, the second floor cross member 40 has, in a vertical section along the vehicle-width direction, an upper enlarged section 40a with a section enlarged toward the vehicle upper side substantially at the middle in the vehicle-width direction so that an upper surface of the second floor cross member 40 substantially at the middle in the vehicle-width direction is located on the vehicle upper side with respect to the upper surface on the vehicle-width-direction outer side.

As shown in FIGS. 2 to 4, the kick-up reinforcing element 50 covers the rear opening S2 in the front floor panel 8 and connects the kick-up front surface 9a of the kick-up portion 9 and the front floor panel 8 substantially at the middle in the vehicle-width direction.

As shown in FIGS. 2 to 4, the console support bracket 60 connects the expanding member 14 of the front floor panel 8 and the kick-up reinforcing element 50 in the vehicle front-rear direction. Further, the console support bracket 60 is fastened to the upper surface of the first floor cross member 30, the upper surface of the second floor cross member 40, and an upper surface of the standing bracket 70.

As shown in FIGS. 1, 2, and 4, on the console support bracket 60, the shift lever support bracket 5 that supports the shift lever 4 and the center console rear part 3B are fixedly placed. As shown in FIGS. 2 and 4, the standing bracket 70 connects and supports the upper surface of the front floor panel 8 and an upper surface of the console support bracket 60 between the first floor cross member 30 and the second floor cross member 40.

The first floor cross member 30, the second floor cross member 40, the kick-up reinforcing element 50, the console support bracket 60, and the standing bracket 70 will be further described in more detail. As shown in FIGS. 3 and 6, the first floor cross member 30 includes a middle member 31 extending in the vehicle-width direction between the floor frame lower portions 12, a pair of left and right end members 32 joined to opposite ends of the middle member 31 in the vehicle-width direction, a cross member reinforcing element 33 that forms the upper enlarged section 30a, and a pair of left and right front seat outer securing members 34 on which front parts of seat slide rails 17 on the vehicle-width-direction outer side are fixedly placed. The seat slide rails 17 are a pair of left and right seat slide rails 17 that support a front seat 18.

As shown in FIG. 8, the middle member 31 has a substantially hat-shaped vertical section along the vehicle front-rear direction that protrudes toward the vehicle upper side. Specifically, as shown in FIGS. 6 and 8, the middle member 31 integrally includes a member front surface 31a as a surface on the vehicle front side, a member rear surface 31b as a surface on the vehicle rear side, a member upper surface 31c as a surface on the vehicle upper side, a front flange 31d extending from a lower end of the member front surface 31a toward the vehicle front side, and a rear flange 31e extending from a lower end of the member rear surface 31b toward the vehicle rear side.

As shown in FIGS. 6 and 8, the front flange 31d and the rear flange 31e of the middle member 31 are joined to the upper surface of the front floor panel 8. As shown in FIGS. 3 and 6, the member upper surface 31c of the middle member 31 has a substantially rectangular flat shape in plan view, and is formed substantially in the same position in the vehicle up-down direction as an inner portion upper surface 7a of the side sill inner portion 7B.

On the other hand, the left and right end members 32 each have a substantially hat-shaped vertical section along the vehicle front-rear direction that protrudes toward the vehicle upper side, and continuously extend from the middle member 31 in the vehicle-width direction. Specifically, as shown in FIGS. 3 and 6, the end member 32 integrally includes a member upper surface 32a located substantially in the same position in the vehicle up-down direction as the member upper surface 31c of the middle member 31, a member front surface 32b (see FIG. 3) extending from a front end of the member upper surface 32a toward the vehicle lower side, a member rear surface 32c extending from a rear end of the member upper surface 32a toward the vehicle lower side, a front flange extending from a lower end of the member front surface 32b toward the vehicle front side, and a rear flange extending from a lower end of the member rear surface 32c toward the vehicle rear side.

The front flange and the rear flange of the end member 32 are joined to the upper surface of the front floor panel 8, and an extending portion from the member upper surface 32a on the vehicle-width-direction outer side is joined to the inner portion upper surface 7a of the side sill 7.

As shown in FIG. 6, the member upper surface 32a of the end member 32 has a substantially rectangular flat shape in plan view that has substantially the same length in the vehicle front-rear direction as the member upper surface 31c of the middle member 31.

As shown in FIG. 8, the cross member reinforcing element 33 has a substantially gate-shaped vertical section along the vehicle front-rear direction that opens on the vehicle lower side, and forms, together with the middle member 31, a closed section extending in the vehicle-width direction.

Specifically, as shown in FIGS. 6 and 8, the cross member reinforcing element 33 integrally includes an upper surface 33a located on the vehicle upper side with respect to the member upper surface 31c of the middle member 31, a front surface 33b extending from a front end of the upper surface 33a toward the vehicle lower side, a rear surface 33c extending from a rear end of the upper surface 33a toward the vehicle lower side, and a pair of left and right side surfaces 33*d* extending from opposite ends of the upper surface 33*a* in the vehicle-width direction toward the vehicle lower side.

Further, as shown in FIG. 6, the cross member reinforcing element 33 integrally includes a pair of left and right side flanges 33*e* extending from lower ends of the side surfaces 33*d* toward the vehicle-width-direction outer side, and has a hat-shaped vertical section along the vehicle-width direction and forms a closed section together with the member upper surface 31*c* of the middle member 31.

As shown in FIGS. 6 and 8, in the cross member reinforcing element 33, the front surface 33*b* is joined to the member front surface 31*a* of the middle member 31, the rear surface 33*c* is joined to the member rear surface 31*b* of the middle member 31, and the side flanges 33*e* are joined to the member upper surface 31*c* of the middle member 31.

As shown in FIGS. 3, 6, and 8, the upper surface 33*a* and the side surfaces 33*d* of the cross member reinforcing element 33 have a substantially rectangular shape in plan view that has substantially the same length in the vehicle front-rear direction as the member upper surface 31*c* of the middle member 31.

Further, as shown in FIG. 6, front seat inner securing portions 33*f* to which front parts of seat slide rails 17 on the vehicle-width-direction inner side are fastened are integrally formed with opposite ends of the upper surface 33*a* in the vehicle-width direction. The front seat inner securing portions 33*f* are formed substantially in the same position in the vehicle up-down direction as the middle of the upper surface 33*a* in the vehicle-width direction.

In addition, as shown in FIGS. 6 and 8, a fastening bracket (or reinforcing support bracket) 35 having a substantially M-shaped vertical section along the vehicle-width direction is fastened by fastening bolts T1 to the upper surface 33*a* on the vehicle-width-direction inner side with respect to the front seat inner securing portions 33*f*.

As shown in FIG. 8, two weld bolts 36 are joined to an upper surface of the fastening bracket 35 so as to protrude toward the vehicle upper side. As shown in FIG. 8, the weld bolts 36 co-fasten the shift lever support bracket 5 and the console support bracket 60 (a bracket upper surface 672 of a second support bracket 62 described later). As shown in FIGS. 2 and 6, the front seat outer securing member 34 has a substantially box shape expanding toward the vehicle upper side with respect to the member upper surface 32*a* of the end member 32.

As shown in FIGS. 3 and 7, the second floor cross member 40 includes a middle member 41 extending in the vehicle-width direction between the floor frame lower portions 12, a pair of left and right end members 42 joined to opposite ends of the middle member 41 in the vehicle-width direction, and a cross member reinforcing element 43 that forms the upper enlarged section 40*a*.

As shown in FIG. 8, the middle member 41 has a substantially hat-shaped vertical section along the vehicle front-rear direction that protrudes toward the vehicle upper side. Specifically, as shown in FIGS. 7 and 8, the middle member 41 integrally includes a member front surface 41*a* as a surface on the vehicle front side, a member rear surface 41*b* as a surface on the vehicle rear side, a member upper surface 41*c* as a surface on the vehicle upper side, a front flange 41*d* extending from a lower end of the member front surface 41*a* toward the vehicle front side, and a rear flange 41*e* extending from a lower end of the member rear surface 41*b* toward the vehicle rear side.

As shown in FIGS. 7 and 8, the front flange 41*d* and the rear flange 41*e* of the middle member 41 are joined to the upper surface of the front floor panel 8. As shown in FIGS. 3 and 7, the member upper surface 41*c* of the middle member 41 has a substantially rectangular flat shape in plan view, and is located on the vehicle lower side of the inner portion upper surface 7*a* of the side sill inner portion 7B.

On the other hand, the left and right end members 42 are each formed of a high tensile steel plate having lower rigidity than the middle member 41 and having, for example, a thickness of 1.0 mm. Each end member 42 has a substantially hat-shaped vertical section along the vehicle front-rear direction that protrudes toward the vehicle upper side, and continuously extend from the middle member 41 in the vehicle-width direction.

Specifically, as shown in FIGS. 3 and 7, the end member 42 integrally includes a member upper surface 42*a* located substantially in the same position in the vehicle up-down direction as the member upper surface 41*c* of the middle member 41, a member front surface 42*b* (see FIG. 3) extending from a front end of the member upper surface 42*a* toward the vehicle lower side, a member rear surface 42*c* extending from a rear end of the member upper surface 42*a* toward the vehicle lower side, a front flange extending from a lower end of the member front surface 42*b* toward the vehicle front side, and a rear flange extending from a lower end of the member rear surface 42*c* toward the vehicle rear side.

The front flange and the rear flange of the end member 42 are joined to the upper surface of the front floor panel 8, and an extending portion from the member upper surface 42*a* (a front seat outer securing portion 42*f* described later) on the vehicle-width-direction outer side is joined to the inner portion upper surface 7*a* of the side sill 7.

As shown in FIGS. 3 and 7, the member upper surface 42*a* of the end member 42 has a substantially rectangular flat shape in plan view that has substantially the same length in the vehicle front-rear direction as the member upper surface 41*c* of the middle member 41.

Further, as shown in FIGS. 3 and 7, the front seat outer securing portion 42*f* to which the seat slide rail 17 on the vehicle-width-direction outer side is fastened is integrally formed with the vehicle-width-direction outer side of the member upper surface 42*a* so as to expand toward the vehicle upper side. With the configuration as described above, the second floor cross member 40 has, on the vehicle front side, ridges formed at a corner between the member front surface 41*a* and the member upper surface 41*c* of the middle member 41 and a corner between the member upper surface 42*a* and the member front surface 42*b* of the end member 42 and substantially linearly extending in the vehicle width direction in plan view and in front view. Further, the second floor cross member 40 has, on the vehicle rear side, ridges formed at a corner between the member rear surface 41*b* and the member upper surface 41*c* of the middle member 41 and a corner between the member upper surface 42*a* and the member rear surface 42*c* of the end member 42 and substantially linearly extending in the vehicle width direction in plan view and in rear view.

As shown in FIGS. 7 and 8, the cross member reinforcing element 43 has a substantially hat-shaped vertical section along the vehicle front-rear direction that protrudes toward the vehicle upper side, and forms, together with the middle member 41, a closed section that extends in the vehicle-width direction.

Specifically, as shown in FIGS. 7 and 8, the cross member reinforcing element 43 integrally includes an upper surface 43*a* located on the vehicle upper side with respect to the member upper surface 41*c* of the middle member 41, a front surface 43b extending from a front end of the upper surface 43a toward the vehicle lower side, a rear surface 43c extending from a rear end of the upper surface 43a toward the vehicle lower side, a pair of left and right side surfaces 43d extending from opposite ends of the upper surface 43a in the vehicle-width direction toward the vehicle lower side, a front flange 43e extending from a lower end of the front surface 43b toward the vehicle front side, and a rear flange 43f extending from a lower end of the rear surface 43c toward the vehicle rear side.

Further, as shown in FIG. 7, the cross member reinforcing element 43 integrally includes a pair of left and right side flanges 43g extending from lower ends of the side surfaces 43d toward the vehicle-width-direction outer side so as to have a hat-shaped vertical section along the vehicle-width direction and form a closed section together with the member upper surface 41c of the middle member 41.

As shown in FIGS. 7 and 8, in the cross member reinforcing element 43, the front flange 43e is joined via the front flange 41d of the middle member 41 to the upper surface of the front floor panel 8, the rear flange 43f is joined via the rear flange 41e of the middle member 41 to the upper surface of the front floor panel 8, and the side flange 43g is joined to the member upper surface 41c of the middle member 41.

As shown in FIGS. 3, 7, and 8, the upper surface 43a and the side surfaces 43d of the cross member reinforcing element 43 have a substantially rectangular shape in plan view that has substantially the same length in the vehicle front-rear direction as the member upper surface 41c of the middle member 41.

Further, as shown in FIG. 7, front seat inner securing portions 43h to which rear parts of the seat slide rails 17 on the vehicle-width-direction inner side are fastened are integrally formed with opposite ends of the upper surface 43a in the vehicle-width direction in substantially the same position in the vehicle up-down direction as the middle of the upper surface 43a in the vehicle-width direction.

In addition, as shown in FIG. 7, two weld nuts 44 into which fastening bolts T2 are threaded are joined to a lower side of the upper surface 43a at a predetermined interval in the vehicle-width direction on the vehicle-width-direction inner side with respect to the front seat inner securing portions 43h. As shown in FIG. 7, the console support bracket 60 (second securing portions 673b of the second support bracket 62 described later) is fastened to the weld nuts 44 by the fastening bolts T2.

As shown in FIGS. 9 and 10, the kick-up reinforcing element 50 includes a body member 51 joined to the kick-up front surface 9a of the kick-up portion 9 and the upper surface of the front floor panel 8 on the vehicle front lower side of the kick-up front surface 9a, and a cover member 52 removably provided on an upper surface of the body member 51.

As shown in FIGS. 9 to 11, the body member 51 has a substantially L-shaped vertical section along the vehicle front-rear direction, and a substantially hat-shaped vertical section along the vehicle-width direction that protrudes toward the vehicle upper side. In other words, the body member 51 has a substantially box shape opening on the vehicle lower side and the vehicle rear side.

More specifically, as shown in FIGS. 9 to 11, the body member 51 integrally includes an upper surface 51a formed substantially in the same position in the vehicle up-down direction as the lower end of the kick-up front surface 9a of the kick-up portion 9, a pair of left and right side walls 51b extending from opposite ends of the upper surface 51a in the vehicle-width direction toward the vehicle lower side, and a front wall 51c extending from a front end of the upper surface 51a toward the vehicle lower side, and has a substantially box shape covering the rear opening S2 in the front floor panel 8.

Further, the body member 51 includes extending portions from lower ends of the side walls 51b toward the vehicle-width-direction outer side like flanges, and an extending portion from a lower end of the front wall 51c toward the vehicle front side like a flange, which integrally form a substantially U-shaped flange 51d in plan view along the lower ends of the left and right side walls 51b and the lower end of the front wall 51c.

The upper surface 51a and the left and right side walls 51b of the body member 51 are joined to the kick-up front surface 9a of the kick-up portion 9, and the flange 51d is joined to the upper surface of the front floor panel 8.

As shown in FIGS. 9 and 11, weld nuts 53 into which fastening bolts T3 are threaded through openings provided on the vehicle front upper side are joined to inner surfaces of the side walls 51b of the body member 51. A rear part of the console support bracket 60 is fastened to the weld nuts 53 by the fastening bolts T3.

As shown in FIG. 10, the upper surface 51a has a substantially rectangular opening S3 in plan view in an area facing the rear opening S2 in the front floor panel 8. Further, as shown in FIGS. 9 and 11, four weld bolts 54 protruding toward the vehicle upper side are joined to the upper surface 51a around the opening S3. The weld bolts 54 co-fasten the rear part of the console support bracket 60 and the cover member 52.

On the other hand, as shown in FIGS. 9 and 10, the cover member 52 has a predetermined thickness in the vehicle up-down direction and is substantially flat to cover the opening S3 in the body member 51. As shown in FIGS. 10 and 11, the cover member 52 is co-fastened by the weld bolts 54 to the body member 51 with the rear part of the console support bracket 60 therebetween.

As shown in FIGS. 2 and 3, the console support bracket 60 connects the expanding member 14 of the front floor panel 8 and the kick-up reinforcing element 50 in the vehicle front-rear direction. As shown in FIGS. 1 to 4, the console support bracket 60 includes, in the vehicle interior of the electric vehicle 1, a first support bracket 61 that supports the center console front part 3A, and a second support bracket 62 that supports the shift lever 4 and the center console rear part 3B.

As shown in FIG. 5, the first support bracket 61 includes a bracket body 63 joined to the expanding member 14 of the front floor panel 8, and a reinforcement 64 that reinforces a rear part of the bracket body 63. As shown in FIGS. 4 and 5, the first support bracket 61 has substantially the same length in the vehicle front-rear direction as the expanding member 14 of the front floor panel 8.

Specifically, as shown in FIGS. 5 and 12, the bracket body 63 includes a pair of left and right bracket side walls 631 facing each other in the vehicle-width direction, and a bracket upper surface 632 connecting upper ends of the bracket side walls 631, and has a substantially gate shape in front view.

As shown in FIGS. 5 and 12, the bracket upper surface 632 is recessed toward the vehicle lower side, and has a recessed groove 632a extending in the vehicle front-rear direction substantially at the middle in the vehicle-width direction. The recessed groove 632a is recessed from a substantial middle to a rear end of the bracket upper surface 632 in the vehicle front-rear direction.

As shown in FIG. 4, in a vertical section of the bracket body 63 along the vehicle front-rear direction, the bracket upper surface 632 spaced apart from the rear wall 14b of the expanding member 14 on the vehicle front side with respect to the reinforcement 64 of the first support bracket 61 described later is connected to the rear wall 14b of the expanding member 14 via a connecting bracket 19 having a substantially Z-shaped section.

On the other hand, as shown in FIG. 5, the reinforcement 64 of the first support bracket 61 is joined to an inner surface of the rear part of the bracket body 63. As shown in FIGS. 5 and 12, the reinforcement 64 integrally includes a pair of left and right side surfaces 641 joined to upper parts of the bracket side walls 631 of the bracket body 63, and an upper surface 642 joined to the bracket upper surface 632 of the bracket body 63.

As shown in FIGS. 5 and 12, weld nuts 65 into which fastening bolts T4 are threaded through openings provided in the bracket side walls 631 of the bracket body 63 are welded to rear parts of the side surfaces 641 of the reinforcement 64 of the first support bracket 61. The front part of the second support bracket 62 is fastened to the weld nuts 65 by the fastening bolts T4.

Further, as shown in FIGS. 5 and 12, weld bolts 66 protruding toward the vehicle upper side are joined to a rear part of the upper surface 642 through openings provided in the bracket upper surface 632 of the bracket body 63 at a predetermined interval in the vehicle-width direction. The front part of the second support bracket 62 is fastened to the weld bolts 66.

As shown in FIG. 13, the second support bracket 62 includes a bracket body 67 connected to a rear part of the first support bracket 61, and a reinforcement 68 that reinforces a front part of the bracket body 67.

As shown in FIGS. 11 to 13, the bracket body 67 integrally includes a pair of left and right bracket side walls 671 facing each other in the vehicle-width direction, and a bracket upper surface 672 connecting upper ends of the bracket side walls 671 in the vehicle-width direction, and has a substantially gate-shaped vertical section along the vehicle-width direction that opens on the vehicle lower side.

As shown in FIG. 13, the left and right bracket side walls 671 are substantially flat with a longer length in the vehicle front-rear direction than in the vehicle up-down direction. Each bracket side wall 671 has a length in the vehicle up-down direction shorter than a length from the bracket upper surface 672 to the upper surface of the front floor panel 8 in the vehicle up-down direction.

Further, as shown in FIG. 13, a flange 673 extending on the vehicle-width-direction outer side is integrally formed with a lower end of the bracket side wall 671 from a front end to a rear end. The flange 673 includes, at a predetermined interval in the vehicle front-rear direction, a first securing portion 673a fastened to the upper surface of the first floor cross member 30, and a second securing portion 673b fastened to the upper surface of the second floor cross member 40, which further extend toward the vehicle-width-direction outer side as flanges.

As shown in FIGS. 11 to 13, the bracket side wall 671 has, near a front end, a bolt insertion hole 671a through which the fastening bolt T4 can be inserted, and has, near a rear end, a bolt insertion hole 671b through which the fastening bolt T3 can be inserted.

As shown in FIGS. 2 to 4, on a front part of the bracket upper surface 672 of the bracket body 67, the shift lever support bracket 5 that supports the shift lever 4 from the vehicle lower side, and the center console rear part 3B are fixedly placed in this order from the vehicle front side.

As shown in FIGS. 3 and 13, the bracket upper surface 672 has a substantially rectangular flat shape in plan view that has a substantially constant length in the vehicle-width direction and is long in the vehicle front-rear direction. Thus, the bracket body 67 of the second support bracket 62 has ridges, which substantially linearly extend in the vehicle front-rear direction at least in plan view, formed at corners between the bracket side walls 671 and the bracket upper surface 672 and corners between the bracket side walls 671 and the flanges 673.

Further, as shown in FIGS. 12 and 13, the bracket upper surface 672 is recessed toward the vehicle lower side continuously with the recessed groove 632a in the first support bracket 61, and has a recessed groove 672a extending in the vehicle front-rear direction substantially at the middle in the vehicle-width direction.

As shown in FIGS. 3 and 13, the recessed groove 672a in the bracket upper surface 672 has a length from a front end of the bracket upper surface 672 to the vicinity of the second securing portion 673b in the vehicle front-rear direction. The recessed groove 632a in the first support bracket 61 and the recessed groove 672a in the second support bracket 62 increase rigidity of the first support bracket 61 and the second support bracket 62, and are also formed as spaces in which a wire harness (not shown) routed along the vehicle front-rear direction in the vehicle interior is accommodated.

As shown in FIGS. 8, 12, and 13, the bracket upper surface 672 has, near a front end, two bolt insertion holes 672b through which the weld bolts 66 of the first support bracket 61 can be inserted, and has two bolt insertion holes 672c through which the weld bolts 36 of the fastening bracket 35 of the first floor cross member 30 can be inserted, substantially in the same position in the vehicle front-rear direction as the first securing portion 673a.

Further, as shown in FIGS. 11 and 13, the bracket upper surface 672 has, between the first securing portion 673a and the second securing portion 673b, a plurality of bolt insertion holes 672d through which weld bolts 76 of the standing bracket 70 described later can be inserted, and has, near a rear end, two bolt insertion holes 672e through which two weld bolts 54 on the vehicle front side among the four weld bolts 54 of the kick-up reinforcing element 50 can be inserted.

As shown in FIGS. 12 and 13, the reinforcement 68 of the second support bracket 62 is joined to an inner surface of the front part of the bracket body 67. As shown in FIGS. 12 and 13, the reinforcement 68 integrally includes a pair of left and right side surfaces 681 joined to the bracket side walls 671 of the bracket body 67, and an upper surface 682 joined to the bracket upper surface 672 of the bracket body 67, and forms a substantially gate shape in front view.

As shown in FIG. 12, in the console support bracket 60 having the above described configuration, a rear part of the bracket side wall 631 of the first support bracket 61 and a front part of the bracket side wall 671 of the second support bracket 62 are fastened by the fastening bolts T4, and a rear part of the bracket upper surface 632 of the first support bracket 61 and a front part of the bracket upper surface 672 of the second support bracket 62 are fastened by the weld bolts 66, and thus the first support bracket 61 and the second support bracket 62 are connected in the vehicle front-rear direction.

Further, the console support bracket 60 is connected to the expanding member 14 by the bracket side walls 631 and the bracket upper surface 632 of the first support bracket 61 being joined to the side walls 14a and the rear wall 14b of the expanding member 14, respectively.

In addition, as shown in FIG. 11, in the console support bracket 60, the bracket side walls 671 of the second support bracket 62 are fastened by the fastening bolts T3 to the side walls 51b of the kick-up reinforcing element 50, and the bracket upper surface 672 of the second support bracket 62 is co-fastened by the weld bolts 54 to the upper surface 51a of the kick-up reinforcing element 50 together with the cover member 52.

Thus, the console support bracket 60 connects the expanding member 14 of the front floor panel 8 and the kick-up reinforcing element 50 in the vehicle front-rear direction. Further, in the console support bracket 60, the bracket upper surface 672 of the second support bracket 62 is co-fastened by the weld bolts 36 to the fastening bracket 35 of the first floor cross member 30 together with the front part of the shift lever support bracket 5.

As shown in FIGS. 6 and 7, in the console support bracket 60, the first securing portion 673a of the second support bracket 62 is fastened by the fastening bolts T1 to the cross member reinforcing element 33 of the first floor cross member 30, and the second securing portion 673b of the second support bracket 62 is fastened by the fastening bolts T2 to the cross member reinforcing element 43 of the second floor cross member 40.

As shown in FIGS. 14 and 15, the standing bracket 70 has a substantially M-shaped vertical section along the vehicle-width direction, and is joined to the upper surface of the front floor panel 8 between the first floor cross member 30 and the second floor cross member 40.

As shown in FIGS. 14 and 15, the standing bracket 70 integrally includes, substantially at the middle in the vehicle-width direction, a pair of left and right inner side surfaces 71 facing each other in the vehicle-width direction, a substantially flat bottom 72 connecting lower ends of the inner side surfaces 71 in the vehicle-width direction, upper surfaces 73 extending from upper ends of the inner side surfaces 71 toward the vehicle-width-direction outer sides, legs 74 extending from the vehicle-width-direction outer sides of the upper surfaces 73 toward the vehicle lower side and facing each other with the left and right inner side surfaces 71 therebetween, and left and right side flanges 75 extending from lower ends of the legs 74 toward the vehicle-width-direction outer sides.

The left and right inner side surfaces 71 have beads 71a, which protrude toward the vehicle-width-direction inner side and extend in the vehicle up-down direction, formed at predetermined intervals in the vehicle front-rear direction. The left and right legs 74 have beads 74a, which protrude toward the vehicle-width-direction outer side and extend in the vehicle up-down direction, formed at predetermined intervals in the vehicle front-rear direction. As shown in FIG. 6, a plurality of weld bolts 76 protruding toward the vehicle upper side are joined to the left and right upper surfaces 73 via bolt insertion holes 672d provided in the bracket upper surface 672 of the second support bracket 62.

As shown in FIG. 14, the weld bolts 76 are fastened to the bracket upper surface 672 of the second support bracket 62. As shown in FIG. 8, two weld bolts 76 on the vehicle front side among the plurality of weld bolts 76 co-fasten the bracket upper surface 672 of the second support bracket 62 and the rear part of the shift lever support bracket 5.

As described above, the lower vehicle-body structure of the electric vehicle 1 that uses output from the rotary electric machine as a drive force includes: the pair of left and right side sills 7 extending in the vehicle front-rear direction; the substantially flat front floor panel 8 disposed between the side sills 7; the first floor cross member 30 disposed on the upper surface of the front floor panel 8 located below the front part of the front seat on which the occupant sits and connecting the left and right side sills 7 in the vehicle-width direction; the second floor cross member 40 disposed on the upper surface of the front floor panel 8 located below the rear part of the front seat and connecting the left and right side sills 7 in the vehicle-width direction; the kick-up portion 9 raised from the rear end of the front floor panel 8 toward the vehicle upper side; and the console support bracket 60 that has the front part connected to the vehicle body on the vehicle front side and the rear part connected to the kick-up portion 9, and supports the center console 3, and the lower part of the console support bracket 60 is secured to the first floor cross member 30 and the second floor cross member 40. Thus, the lower vehicle-body structure of the electric vehicle 1 can prevent an increase in weight, ensure desired resistance to front-end collision, and reduce weight of the support structure for the center console 3.

Specifically, the console support bracket 60 extending in the vehicle front-rear direction is secured to the first floor cross member 30 and the second floor cross member 40 connecting the left and right side sills 7 in the vehicle-width direction. Thus, the lower vehicle-body structure of the electric vehicle 1 can distribute and transfer, in the vehicle front-rear direction via the console support bracket 60, the collision load applied from the vehicle lateral side to the first floor cross member 30 and the second floor cross member 40.

Further, the front part of the console support bracket 60 is connected to the vehicle body on the vehicle front side, and the rear part of the console support bracket 60 is connected to the kick-up portion 9. Thus, the lower vehicle-body structure of the electric vehicle 1 can transfer the collision load from the vehicle front side to the vehicle rear side via the console support bracket 60.

In this case, the lower vehicle-body structure of the electric vehicle 1 can distribute and transfer the collision load from the vehicle front side via the first floor cross member 30 and the second floor cross member 40. Thus, the lower vehicle-body structure of the electric vehicle 1 can ensure rigidity of the vehicle interior floor surface against the collision load from the vehicle lateral side and the collision load from the vehicle front side.

In addition, the lower part of the console support bracket 60 is secured to the first floor cross member 30 and the second floor cross member 40. Thus, the lower vehicle-body structure of the electric vehicle 1 can reduce the length of the console support bracket 60 in the vehicle up-down direction as compared to when the console support bracket 60 is secured to the front floor panel 8.

Thus, for example, even if the length of the console support bracket 60 in the vehicle front-rear direction is substantially the same as a length of a tunnel in the vehicle front-rear direction when the floor panel includes the tunnel, the lower vehicle-body structure of the electric vehicle 1 can reduce weight of the console support bracket 60 by the length in the vehicle up-down direction. Thus, the lower vehicle-body structure of the electric vehicle 1 can prevent an increase in weight, ensure desired resistance to front-end collision, and reduce weight of the support structure for the center console 3.

The console support bracket 60 includes the pair of left and right bracket side walls 671 facing each other in the vehicle-width direction and the bracket upper surface 672 connecting the upper ends of the bracket side walls 671, and has the substantially inverted U-shaped vertical section along the vehicle-width direction. Thus, the lower vehicle-body structure of the electric vehicle 1 can form the ridges substantially linearly extending in the vehicle front-rear direction at the corners between the bracket side walls 671 and the bracket upper surface 672.

Thus, the lower vehicle-body structure of the electric vehicle 1 can efficiently transfer the collision load from the vehicle front side to the vehicle rear side along the ridges of the console support bracket 60. Thus, the lower vehicle-body structure of the electric vehicle 1 can reduce weight of the support structure for the center console 3 and ensure stable resistance to front-end collision.

The bracket side walls 671 of the console support bracket 60 include the flanges 673 extending from the lower ends of the bracket side walls 671 toward the vehicle-width-direction outer sides. Thus, the lower vehicle-body structure of the electric vehicle 1 can form the ridges substantially linearly extending in the vehicle front-rear direction at bases of the flanges 673.

Thus, the lower vehicle-body structure of the electric vehicle 1 can more efficiently transfer the collision load from the vehicle front side to the vehicle rear side along the ridges at the corners between the bracket side walls 671 and the bracket upper surface 672 and the ridges at the bases of the flanges 673. Thus, the lower vehicle-body structure of the electric vehicle 1 can reduce weight of the support structure for the center console 3 and ensure more stable resistance to front-end collision.

The flanges 673 of the console support bracket 60 are fastened to the first floor cross member 30 and the second floor cross member 40. Thus, the lower vehicle-body structure of the electric vehicle 1 can efficiently secure the console support bracket 60 to the first floor cross member 30 and the second floor cross member 40.

The first floor cross member 30 and the second floor cross member 40 include, in the vertical sections along the vehicle-width direction, the upper enlarged sections 30$a$, 40$a$ with the sections enlarged toward the vehicle upper side substantially at the middle in the vehicle-width direction so that the upper surfaces of the first floor cross member 30 and the second floor cross member 40 are located on the vehicle upper side with respect to the upper surfaces near the ends in the vehicle-width direction, and the flanges 673 of the console support bracket 60 are fastened to the upper enlarged section 30$a$ of the first floor cross member 30 and the upper enlarged section 40$a$ of the second floor cross member 40. Thus, the lower vehicle-body structure of an electric vehicle 1 can ensure stable resistance to lateral collision and further reduce weight of the support structure for the center console 3.

Specifically, the first floor cross member 30 and the second floor cross member 40 include the upper enlarged sections 30$a$, 40$a$. Thus, the lower vehicle-body structure of the electric vehicle 1 can increase rigidity of the first floor cross member 30 and the second floor cross member 40, which are long in the vehicle-width direction, substantially at the middle in the vehicle-width direction. Thus, the lower vehicle-body structure of the electric vehicle 1 can increase rigidity of the vehicle interior floor surface against the collision load from the vehicle lateral side.

Further, the flanges 673 of the console support bracket 60 are fastened to the upper enlarged section 30$a$ of the first floor cross member 30 and the upper enlarged section 40$a$ of the second floor cross member 40. Thus, the lower vehicle-body structure of the electric vehicle 1 can reduce the length of the console support bracket 60 in the vehicle up-down direction as compared to when the flanges 673 of the console support bracket 60 are fastened to the member upper surfaces 31$c$, 41$c$ adjacent to the upper enlarged sections 30$a$, 40$a$. Thus, the lower vehicle-body structure of the electric vehicle 1 can ensure stable resistance to lateral collision and further reduce weight of the support structure for the center console 3.

The front floor panel 8 includes the expanding member 14 expanding toward the vehicle upper side on the vehicle front side of the first floor cross member 30, and the bracket upper surface 672 and the left and right bracket side walls 671 of the console support bracket 60 are secured to the expanding member 14 of the front floor panel 8. Thus, the lower vehicle-body structure of the electric vehicle 1 can increase support rigidity of the front part of the console support bracket 60 as compared to, for example, when only the bracket upper surface 672 of the console support bracket 60 is secured to the expanding member 14 of the front floor panel 8.

Further, the lower vehicle-body structure of the electric vehicle 1 can transfer the collision load from the vehicle front side to the console support bracket 60 via a securing area between the expanding member 14 of the front floor panel 8 and the bracket upper surface 672 and securing areas between the expanding member 14 of the front floor panel 8 and the bracket side walls 671. Thus, the lower vehicle-body structure of the electric vehicle 1 can efficiently transfer the collision load from the vehicle front side to the console support bracket 60 and thus ensure more stable resistance to front-end collision.

The lower vehicle-body structure of the electric vehicle 1 includes the kick-up reinforcing element 50 connecting the substantial middle of the kick-up portion 9 in the vehicle-width direction and the front floor panel 8 in front of the substantial middle of the kick-up portion 9, the kick-up reinforcing element 50 integrally includes the pair of left and right side walls 51$b$ facing each other in the vehicle-width direction, the front wall 51$c$ connecting the front ends of the side walls 51$b$, and the upper surface 51$a$ connecting the upper ends of the side walls 51$b$, the bracket upper surface 672 of the console support bracket 60 is fastened to the upper surface 51$a$ of the kick-up reinforcing element 50, and the bracket side walls 671 of the console support bracket 60 are fastened to the side walls 51$b$ of the kick-up reinforcing element 50. Thus, the lower vehicle-body structure of the electric vehicle 1 can increase support rigidity of the rear part of the console support bracket 60 as compared to, for example, when only the bracket upper surface 672 of the console support bracket 60 is secured to the kick-up reinforcing element 50.

Further, the lower vehicle-body structure of the electric vehicle 1 includes the kick-up reinforcing element 50 connecting the kick-up portion 9 and the front floor panel 8 for reinforcement, and thus can increase support rigidity of the kick-up portion 9 against the load in the vehicle front-rear direction. Thus, the lower vehicle-body structure of the electric vehicle 1 can efficiently transfer the collision load from the vehicle front side farther toward the vehicle rear side via the kick-up portion 9.

In addition, the lower vehicle-body structure of the electric vehicle 1 can transfer the collision load from the vehicle rear side to the vehicle front side via the console support bracket 60 and distribute and transfer the collision load to the front floor panel 8 via the kick-up reinforcing element 50 when the collision load is applied from the vehicle rear side.

Thus, the lower vehicle-body structure of the electric vehicle 1 can prevent the rear floor panel 10 connected to the vehicle rear side of the kick-up portion 9 from being deformed to curve toward the vehicle upper side around the lower end of the kick-up portion 9, for example, when the collision load is applied from the vehicle rear side. Thus, the lower vehicle-body structure of the electric vehicle 1 can prevent an increase in weight and ensure both stable resistance to front-end collision and stable resistance to rear-end collision.

The lower vehicle-body structure of the electric vehicle 1 includes the standing bracket 70 standing toward the vehicle upper side on the front floor panel 8 between the first floor cross member 30 and the second floor cross member 40, the standing bracket 70 includes the pair of left and right legs 74 secured to the front floor panel 8 and the upper surface 73 connecting the upper ends of the legs 74, and the bracket upper surface 672 of the console support bracket 60 is fastened to the upper surface 73 of the standing bracket 70. Thus, the lower vehicle-body structure of the electric vehicle 1 can use the standing bracket 70 to increase support rigidity of the console support bracket 60 between the first floor cross member 30 and the second floor cross member 40.

Further, the front floor panel 8 can be supported via the console support bracket 60 and the standing bracket 70. Thus, the lower vehicle-body structure of the electric vehicle 1 can increase rigidity of the front floor panel 8 between the first floor cross member 30 and the second floor cross member 40.

Thus, the lower vehicle-body structure of the electric vehicle 1 can use the standing bracket 70 and the console support bracket 60 to prevent membrane vibration of the front floor panel 8 caused by, for example, vehicle body vibration during traveling. Thus, the lower vehicle-body structure of the electric vehicle 1 can ensure much more stable resistance to front-end collision and prevent vibration noise due to the membrane vibration of the front floor panel 8.

The lower vehicle-body structure of the electric vehicle 1 includes the shift lever support bracket 5 that is secured to the bracket upper surface 672 of the console support bracket 60 and supports the shift lever 4, the bracket upper surface 672 and the flanges 673 of the console support bracket 60 are secured to the first floor cross member 30, the bracket upper surface 672 of the console support bracket 60 is secured to the standing bracket 70, and the flanges 673 of the console support bracket 60 are secured to the second floor cross member 40. Thus, the lower vehicle-body structure of the electric vehicle 1 can prevent bending deformation of the console support bracket 60 and reduce weight of the support structure for the center console 3.

Specifically, the load in the vehicle front-rear direction applied to the shift lever 4, the load in the vehicle-width direction, and the load in the vehicle up-down direction are applied to the console support bracket 60 via the shift lever support bracket 5. Thus, the console support bracket 60 may be bent and deformed by the loads applied to the shift lever 4, which may cause, for example, reduced shift feeling or unintended vibration noise.

Then, the bracket upper surface 672 and the flanges 673 of the console support bracket 60 are secured to the first floor cross member 30. Thus, the lower vehicle-body structure of the electric vehicle 1 can support the console support bracket 60 in an area with high rigidity relatively near the shift lever 4.

Further, the bracket upper surface 672 of the console support bracket 60 is secured to the standing bracket 70. Thus, the lower vehicle-body structure of the electric vehicle 1 can increase support rigidity of the console support bracket 60 and prevent bending deformation of the bracket upper surface 672 of the console support bracket 60 by cooperation between the first floor cross member 30 relatively near the shift lever 4 and the standing bracket 70.

On the other hand, the flanges 673 of the console support bracket 60 are secured to the second floor cross member 40. Thus, the lower vehicle-body structure of the electric vehicle 1 can distribute and transfer, to the standing bracket 70 and the second floor cross member 40, the load applied from the shift lever 4 to the console support bracket 60.

In this case, the load applied from the shift lever 4 to the console support bracket 60 decreases toward the vehicle rear side. Thus, the lower vehicle-body structure of the electric vehicle 1 can reduce the number of securing areas of the console support bracket 60 to the standing bracket 70 and the number of securing areas of the console support bracket 60 to the second floor cross member 40 to be smaller than the number of securing areas of the console support bracket 60 to the first floor cross member 30 without reducing support rigidity of the console support bracket 60.

Thus, the lower vehicle-body structure of the electric vehicle 1 can reduce the number of assembling steps of the console support bracket 60 to the first floor cross member 30, the standing bracket 70, and the second floor cross member 40 and prevent an increase in weight due to an increase in securing areas of the console support bracket 60. Thus, the lower vehicle-body structure of the electric vehicle 1 can prevent bending deformation of the console support bracket 60 and reduce weight of the support structure for the center console 3.

For correspondence between the claims and the above described embodiment, the floor panel of the claims corresponds to the front floor panel 8 of the embodiment. Similarly, the expanding portion corresponds to the expanding member 14, and the kick-up reinforcing portion corresponds to the kick-up reinforcing element 50. However, the present disclosure is not limited to the configuration of the above described embodiment, but may encompass various embodiments.

For example, in the above described embodiment, the separately formed expanding member 14 is joined to the front part of the front floor panel 8, but not limited to this, the front part of the front floor panel 8 substantially at the middle in the vehicle-width direction may be expanded toward the vehicle upper side to integrally form the expanding member 14 with the front floor panel 8.

The kick-up reinforcing element 50 that connects the rear part of the front floor panel 8 and the kick-up portion 9 is separately formed, but not limited to this, the kick-up reinforcing element 50 may be integrally formed with the front floor panel 8 or the kick-up portion 9.

The first floor cross member 30 includes the middle member 31, the pair of left and right end members 32, and the cross member reinforcing element 33, but not limited to this, the middle member 31 and the left and right end members 32 may be integrally formed. Alternatively, the middle member 31 and the cross member reinforcing element 33 may be integrally formed, or the middle member 31, the pair of left and right end members 32, and the cross member reinforcing element 33 may be integrally formed.

The second floor cross member 40 includes the middle member 41, the pair of left and right end members 42, and the cross member reinforcing element 43, but not limited to this, for example, the middle member 41 and the left and right end members 42 may be integrally formed. Alternatively, the middle member 41 and the cross member reinforcing element 43 may be integrally formed, or the middle member 41, the pair of left and right end members 42, and the cross member reinforcing element 43 may be integrally formed.

The console support bracket 60 includes the first support bracket 61 and the second support bracket 62 fastened to each other, but not limited to this, the first support bracket 61 and the second support bracket 62 may be joined to each other. The console support bracket 60 includes the first support bracket 61 and the second support bracket 62, but not limited to this, the first support bracket 61 and the second support bracket 62 may be integrally formed.

As described above, the lower vehicle-body structure of the electric vehicle 1 that uses output from the rotary electric machine as a drive force includes: the pair of left and right side sills 7 extending in the vehicle front-rear direction; the substantially flat front floor panel 8 disposed between the side sills 7; and the second floor cross member 40 disposed on the upper surface of the front floor panel 8 between the front seat 18 and the rear seat on which occupants sit, and connecting the left and right side sills 7 in the vehicle width direction at a height lower than a height from the front floor panel 8 to the inner portion upper surface 7a of each side sill 7, the second floor cross member 40 includes, in the vertical section along the vehicle width direction, the upper enlarged section 40a with the section enlarged toward the vehicle upper side substantially at the middle in the vehicle-width direction so that the upper surface 43a of the upper enlarged section 40a is located on the vehicle upper side with respect to the upper surfaces near ends of the second floor cross member 40 in the vehicle width direction. Thus, the lower vehicle-body structure of the electric vehicle 1 can ensure both space under occupant's feet and desired resistance to lateral collision.

Specifically, the second floor cross member 40 disposed between the front seat 18 and the rear seat is at the height lower than the height from the front floor panel 8 to the inner portion upper surface 7a of each side sill 7. Thus, the lower vehicle-body structure of the electric vehicle 1 can ensure larger space under feet of an occupant sitting on the rear seat as compared to when using a second floor cross member 40 at substantially the same height as the height from the front floor panel 8 to the inner portion upper surface 7a of each side sill 7.

Further, the second floor cross member 40 includes the upper enlarged section 40a. Thus, the lower vehicle-body structure of the electric vehicle 1 can increase rigidity of the second floor cross member 40, which is long in the vehicle width direction, substantially at the middle in the vehicle-width direction.

Therefore, the lower vehicle-body structure of the electric vehicle 1 can increase rigidity of the vehicle cabin floor against the collision load from the vehicle lateral side. Thus, the lower vehicle-body structure of the electric vehicle 1 can prevent, for example, the front floor panel 8 from being buckled and deformed or bent and deformed substantially at the middle in the vehicle-width direction when the lateral collision load is applied from the vehicle lateral side. Therefore, the lower vehicle-body structure of the electric vehicle 1 can ensure both space under occupant's feet and desired resistance to lateral collision.

The second floor cross member 40 includes a cross member body (middle member 41, end member 42) connecting the left and right side sills 7 and forming, together with the front floor panel 8, the closed cross-section extending in the vehicle width direction, and the cross member reinforcing element 43 secured to the cross member body (middle member 41, end member 42) and forming the upper enlarged section 40a, and the cross member body (middle member 41, end member 42) has the upper surface (member upper surface 41c, member upper surface 42a) with the substantially rectangular flat shape in plan view. Thus, the lower vehicle-body structure of the electric vehicle 1 can form the substantially linear ridges along a front end and a rear end of the upper surface (member upper surface 41c, member upper surface 42a) of the cross member body (middle member 41, end member 42).

Thus, the lower vehicle-body structure of the electric vehicle 1 can efficiently transfer the collision load from the vehicle lateral side from one side sill 7 to the other side sill 7 via the second floor cross member 40. Therefore, the lower vehicle-body structure of the electric vehicle 1 can ensure stable resistance to lateral collision without reducing space under occupant's feet.

The lower vehicle-body structure of the electric vehicle 1 includes the pair of left and right floor frame lower portions 12 disposed on the front floor panel 8 and extending near the side sills 7 in the vehicle front-rear direction, the cross member body includes the middle member 41 located between the floor frame lower portions 12, and the pair of left and right end members 42 located at the opposite ends of the middle member 41 in the vehicle width direction, and the middle member 41 is formed of one member having higher rigidity than the end members 42. Thus, the lower vehicle-body structure of the electric vehicle 1 can increase rigidity of the vehicle cabin floor between the left and right floor frame lower portions 12 and thus ensure more stable resistance to lateral collision.

Specifically, the end members 42 of the second floor cross member 40 are located between the floor frame lower portions 12 and the side sills 7. Thus, the lower vehicle-body structure of the electric vehicle 1 can distribute and transfer the collision load applied from the vehicle lateral side to the side sills 7, to the floor frame lower portions 12 and the middle member 41 of the second floor cross member 40 via the end members 42 of the second floor cross member 40.

In this case, rigidity of the end members 42 is lower than rigidity of the middle member 41. Thus, the lower vehicle-body structure of the electric vehicle 1 can absorb the collision load from the vehicle lateral side by deformation of the end members 42. Thus, the lower vehicle-body structure of the electric vehicle 1 can reduce the lateral collision load applied from the vehicle lateral side to the middle member 41. Therefore, the lower vehicle-body structure of the electric vehicle 1 can increase rigidity of the vehicle cabin floor between the left and right floor frame lower portions 12 and thus ensure more stable resistance to lateral collision.

The cross member reinforcing element 43 is joined to the front floor panel 8 with the lower ends of the middle member 41 being interposed therebetween in the vertical section along the vehicle front-rear direction, and forms the closed cross-section together with the middle member 41. Thus, the lower vehicle-body structure of the electric vehicle 1 can increase rigidity of the second floor cross member 40 substantially at the middle in the vehicle-width direction. Thus, the lower vehicle-body structure of the electric vehicle 1 can ensure more stable resistance to lateral collision without reducing space under occupant's feet.

The upper surface 43a of the cross member reinforcing element 43 includes, at the opposite ends in the vehicle width direction, the front seat inner securing portions 43h to which rear legs of the front seat 18 are secured, and the front seat inner securing portions 43h are formed substantially in the same position in the vehicle up-down direction as the substantial middle of the upper surface 43a in the vehicle-width direction in the vertical section along the vehicle width direction. Thus, the lower vehicle-body structure of the electric vehicle 1 can form the substantially linear ridges along a front end and a rear end of the upper surface 43*a* of the cross member reinforcing element 43 even when the front seat inner securing portions 43*h* are provided. Thus, the lower vehicle-body structure of the electric vehicle 1 can more efficiently transfer the collision load from the vehicle lateral side from one side sill 7 to the other side sill 7 via the second floor cross member 40.

Further, the lower vehicle-body structure of the electric vehicle 1 can reduce irregularities in the upper surface 43*a* of the cross member reinforcing element 43 in the vehicle up-down direction, and thus can reduce the height of the second floor cross member 40 and improve formability of the cross member reinforcing element 43.

Thus, the lower vehicle-body structure of the electric vehicle 1 can ensure space under occupant's feet, stable resistance to lateral collision, and formability of the second floor cross member 40.

The lower vehicle-body structure of the electric vehicle 1 includes the console support bracket 60 that is long in the vehicle front-rear direction and has the front part and the rear part connected to the vehicle body, the console support bracket 60 includes the pair of left and right bracket side walls 671 facing each other in the vehicle width direction and has the substantially inverted U-shaped vertical section along the vehicle width direction, and the bracket side walls 671 of the console support bracket 60 are secured to the upper enlarged section 40*a* of the second floor cross member 40. Thus, the lower vehicle-body structure of the electric vehicle 1 can prevent an increase in weight and ensure much more stable resistance to lateral collision.

Specifically, the upper enlarged section 40*a* of the second floor cross member 40 that is long in the vehicle width direction can be supported by the console support bracket 60 having the front part and the rear part connected to the vehicle body. Thus, the lower vehicle-body structure of the electric vehicle 1 can increase rigidity of the second floor cross member 40 substantially at the middle in the vehicle-width direction.

Further, the bracket side walls 671 of the console support bracket 60 are secured to the upper enlarged section 40*a*. Thus, the lower vehicle-body structure of the electric vehicle 1 can distribute and transfer the lateral collision load applied from the vehicle lateral side to the second floor cross member 40, in the vehicle front-rear direction via the console support bracket 60. Thus, the lower vehicle-body structure of the electric vehicle 1 can increase rigidity of the vehicle cabin floor against the lateral collision load from the vehicle lateral side.

In addition, the bracket side walls 671 of the console support bracket 60 are not secured to the front floor panel 8. Thus, the lower vehicle-body structure of the electric vehicle 1 can reduce the length of each bracket side wall 671 in the vehicle up-down direction as compared to when the bracket side walls 671 of the console support bracket 60 are secured to the front floor panel 8. Thus, the lower vehicle-body structure of the electric vehicle 1 can reduce weight of the console support bracket 60 as compared to when the bracket side walls 671 are secured to the front floor panel 8. Therefore, the lower vehicle-body structure of the electric vehicle 1 can prevent an increase in weight and ensure much more stable resistance to lateral collision.

For correspondence between the configuration of the claims and the above described embodiment, the floor panel of the claims corresponds to the front floor panel 8 of the embodiment. Similarly, the floor cross member corresponds to the second floor cross member 40, the cross member body corresponds to the middle member 41 and the end member 42, the upper surface of the cross member body corresponds to the member upper surface 41*c* of the middle member 41 and the member upper surface 42*a* of the end member 42, the floor frame corresponds to the floor frame lower portion 12, the member middle portion corresponds to the middle member 41, the member end portion corresponds to the end member 42, the upper surface of the cross member reinforcing element corresponds to the upper surface 43*a* of the cross member reinforcing element 43, the seat securing portion corresponds to the front seat inner securing portion 43*h*, the elongated member corresponds to the console support bracket 60, and the side wall corresponds to the bracket side wall 671. However, the present disclosure is not limited to the configuration of the above described embodiment, but may encompass various embodiments.

The bulging member or the expanding member 14 as a front vehicle body and the kick-up reinforcing element 50 as a rear vehicle body are connected in the vehicle front-rear direction by the console support bracket 60 that supports the center console 3, the shift lever 4, and the shift lever support bracket 5, but not limited to this, the bulging member 14 and the kick-up reinforcing element 50 may be connected in the vehicle front-rear direction by a long member that transfers a load in the vehicle front-rear direction.

The Second Embodiment

An increase in resistance to lateral collision, and also a reduction in weight of a console support bracket and an increase in support rigidity of the console support bracket, is achieved by a lower vehicle-body structure of an electric vehicle including a floor panel that forms a vehicle cabin floor; a floor cross member disposed below a front part of a front seat to linearly extend in a vehicle width direction between a pair of left and right side sills at a height of the side sills above the floor panel; and a console support bracket that is disposed above a middle of the floor cross member and supports a console. An upper enlarged section with a section enlarged upward to a height of the console support bracket is provided on a middle upper part of the floor cross member.

Figure 16:
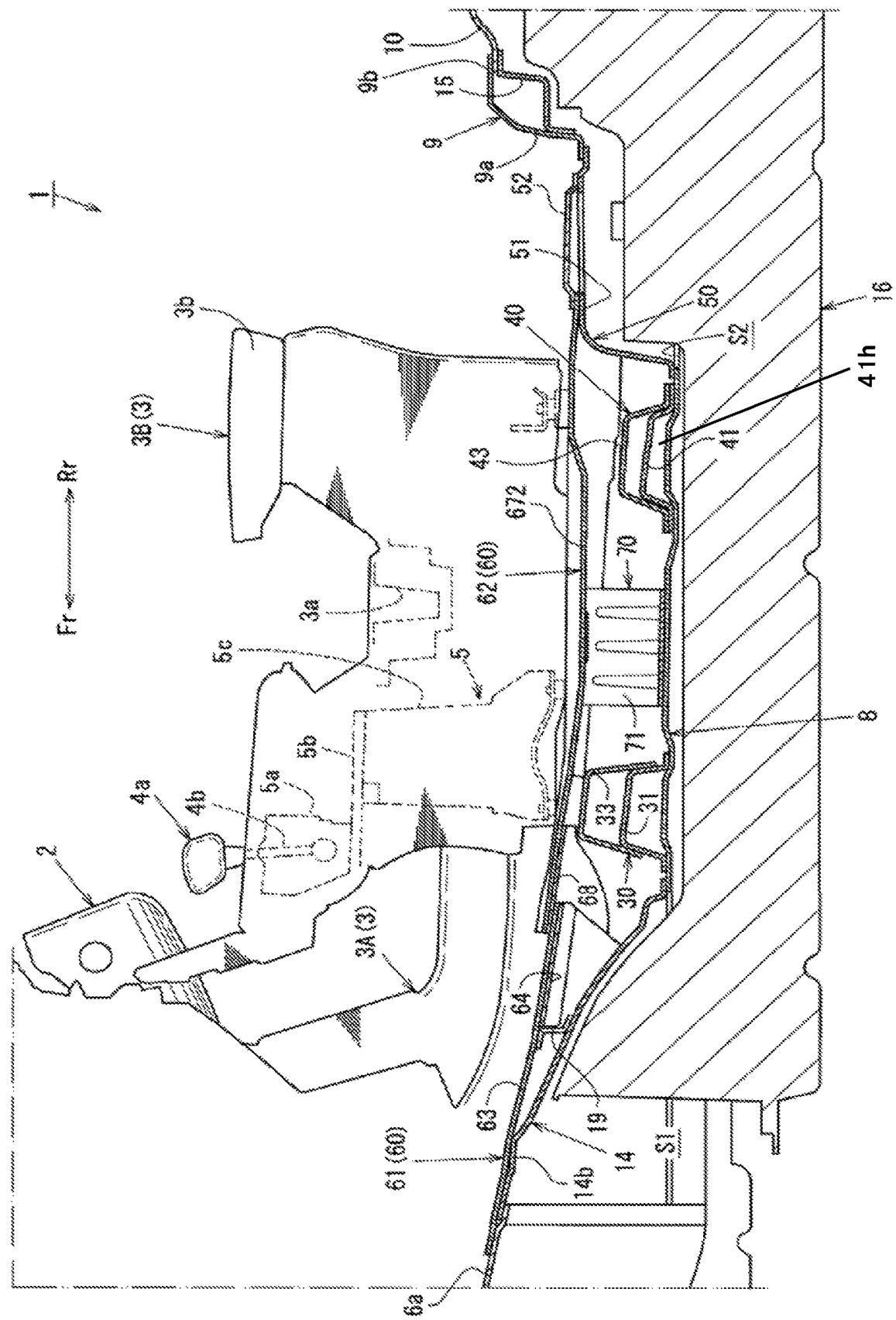
FIG. 16 is a vertical sectional view of the lower vehicle-body structure of the electric vehicle taken in an up-down direction substantially at a middle in a vehicle width direction.

Now, with reference to the drawings, an embodiment of the present disclosure will be described. The drawings show a lower vehicle-body structure of an electric vehicle, FIG. 1 is a perspective view of the lower vehicle-body structure, FIG. 3 is a plan view of the lower vehicle-body structure with an instrument panel and a console being removed, and FIG. 16 is a vertical sectional view of the lower vehicle-body structure of the electric vehicle taken in an up-down direction substantially at a middle in a vehicle width direction. The lower vehicle-body structure of the electric vehicle according to the embodiment described below is formed substantially symmetrically.

In FIGS. 1 and 3, a dash panel 6 is provided that divides a motor room from a vehicle cabin in a vehicle front-rear direction, and an instrument panel 2 is disposed on a vehicle cabin side of the dash panel 6 and in front of a front seat. On a driver's seat side of the instrument panel 2 (right front seat side in the vehicle width direction in this embodiment), a steering column cover is disposed in which a steering column and a steering shaft are provided. As shown in FIGS. 3 and 16, a substantially flat front floor panel 8 is provided continuously with a lower rear end of the dash panel 6. The front floor panel 8 forms a vehicle cabin floor.

As shown in FIG. 16, a battery device (so-called battery pack) 16 as a drive source for vehicle traveling by a motor is disposed below the front floor panel 8. The battery device 16 includes a plurality of battery units including a plurality of battery bodies. The plurality of battery units are arranged in a single-stage structure below the front floor panel 8, and the plurality of battery units are arranged in a two-stage structure below a rear floor pan 10 described later.

The battery device 16 also includes a battery tray that supports the plurality of battery units from below, and a battery case mounted to an upper surface of an outer flange of the battery tray and houses the battery units. A bulging portion bulging toward a tunnel is integrally formed with the battery case in a position corresponding to a part of the tunnel at a middle in the vehicle width direction.

As shown in FIGS. 3 and 16, tunnel-shaped portion 6a is formed continuously with the tunnel 14 in a lower part of the dash panel 6 at the middle in the vehicle width direction.

As shown in FIG. 3, side sills 7, 7 each having a closed cross-section structure and extending in the vehicle front-rear direction are fixedly joined to opposite sides of the front floor panel 8 in the vehicle width direction.

Figure 17:
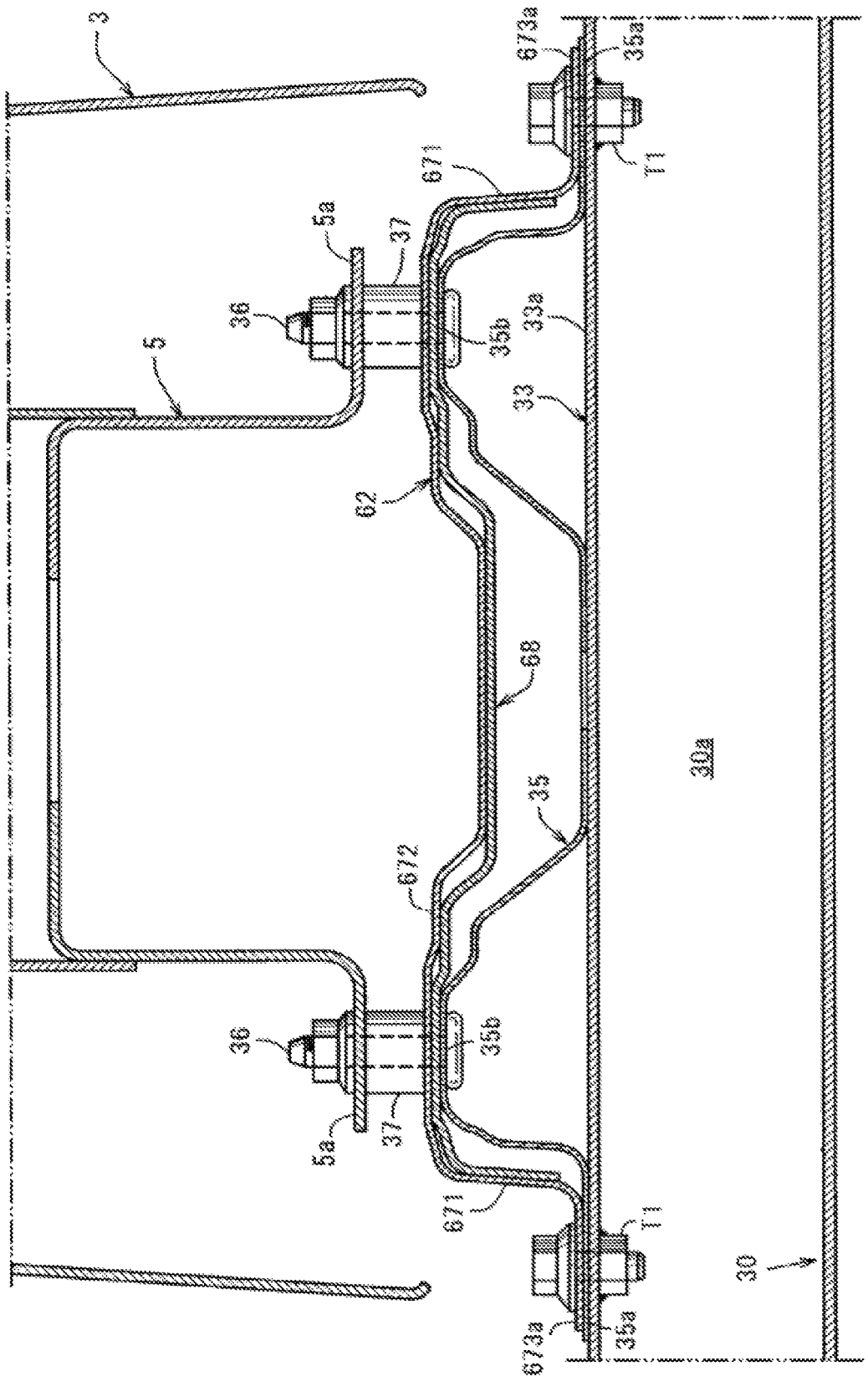
FIG. 17 is an enlarged sectional view of main portions in FIG. 6.
Figure 18:
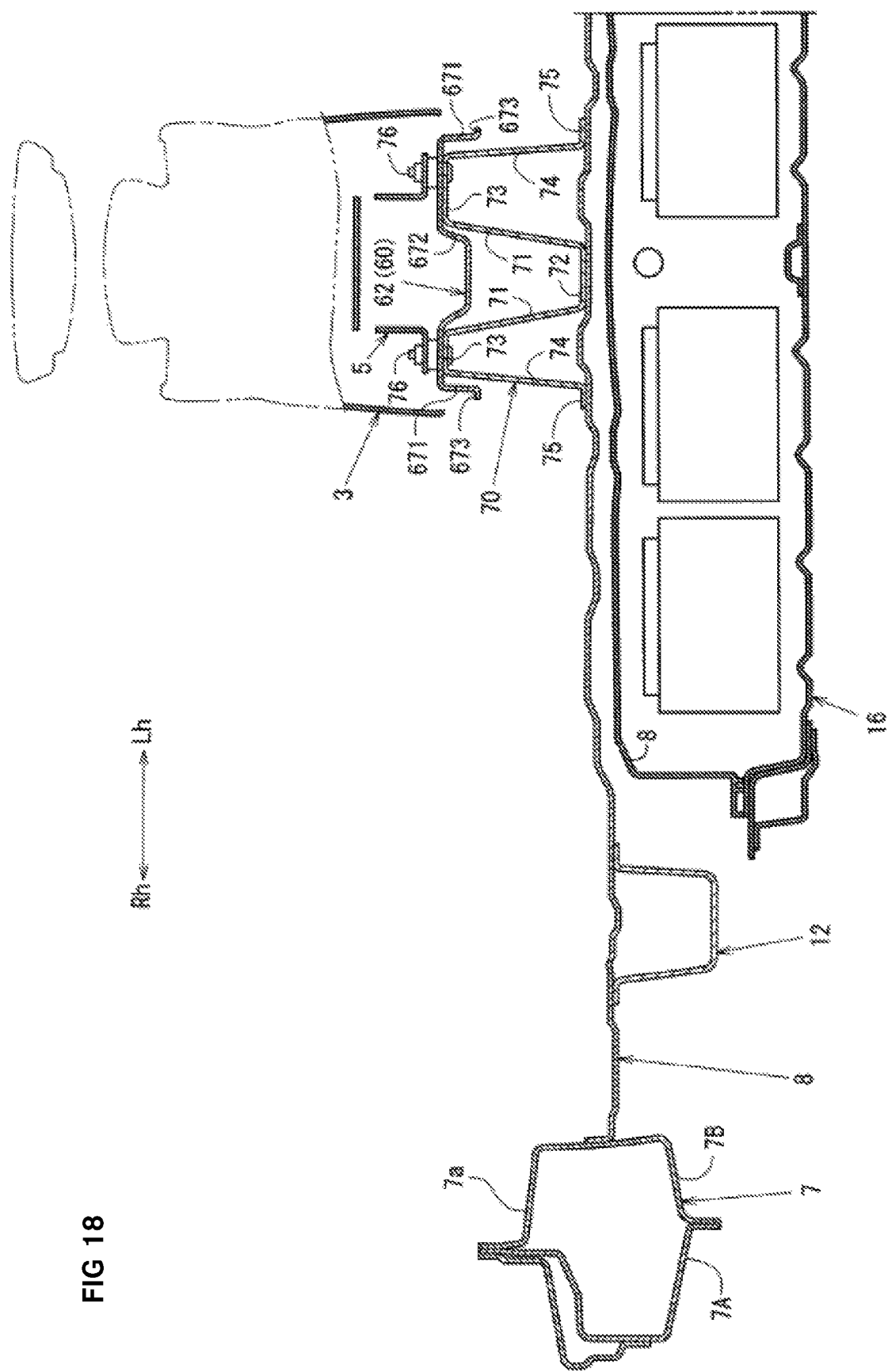
FIG. 18 is a sectional view of main portions taken along the line F-F in FIG. 3.
Figure 19:
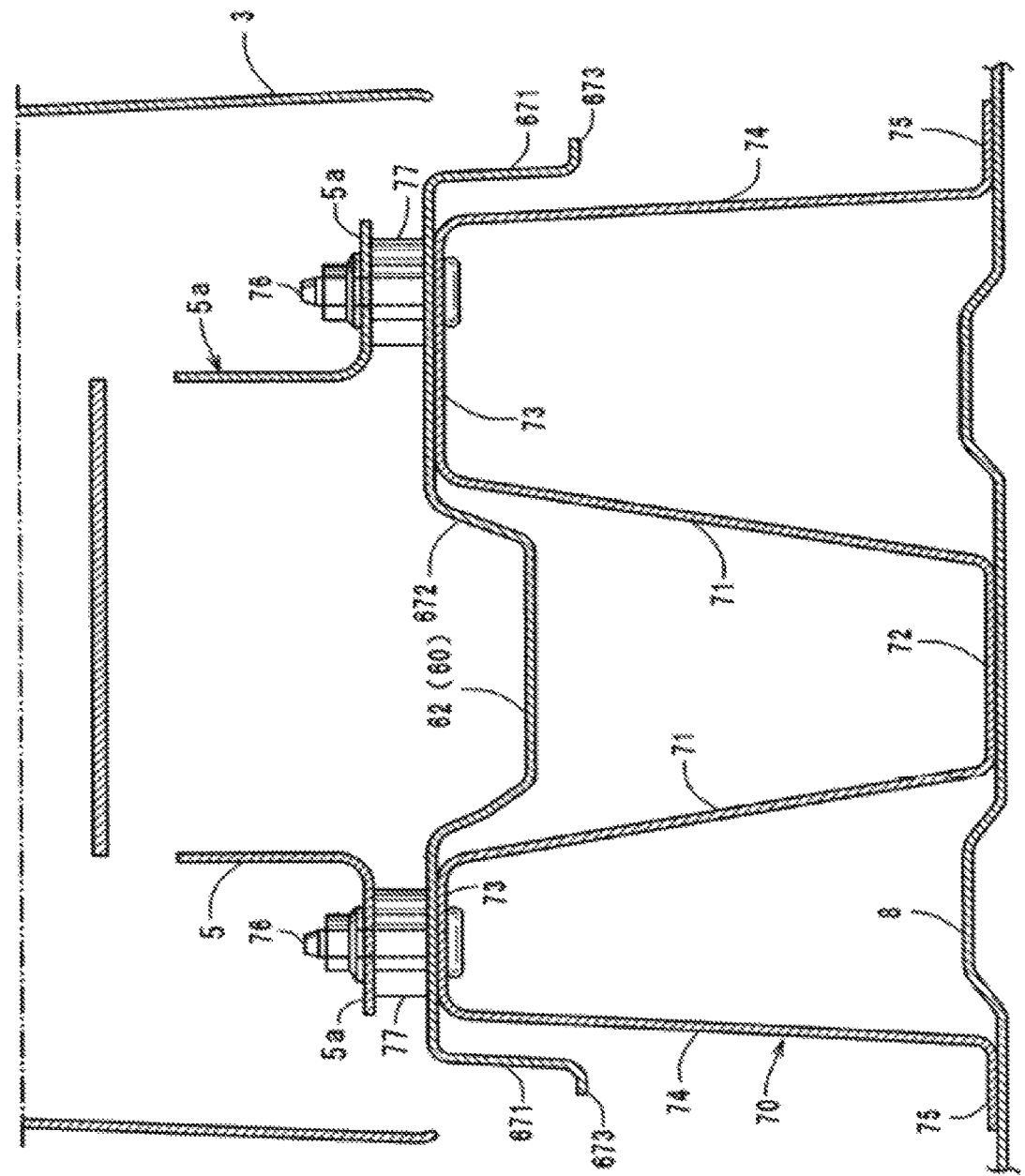
FIG. 19 is an enlarged sectional view of main portions in FIG. 18.

FIG. 13 is a perspective view of a console support bracket, FIG. 5 is a perspective view of the tunnel and a reinforcing bracket, FIG. 15 is a perspective view of a standing bracket, FIG. 9 is a perspective view of a kick-up portion reinforcing element, FIG. 6 is a sectional view of main portions taken along the line B-B in FIG. 3, FIG. 17 is an enlarged sectional view of main portions in FIG. 6, FIG. 18 is a sectional view of main portions taken along the line C-C in FIG. 3, FIG. 19 is an enlarged sectional view of main portions in FIG. 18, and FIG. 7 is a sectional view of main portions taken along the line C-C in FIG. 3.

As shown in FIGS. 6, 18, and 7, each side sill 7 is a vehicle body strengthening member having a side sill closed cross-section formed by a side sill inner portion 7B, a side sill reinforcement, and a side sill outer portion 7A fixedly joined to each other and extending in the vehicle front-rear direction.

As shown in FIGS. 1 and 3, a floor frame upper portion 11 is fixedly joined across an upper surface of the lower part of the dash panel 6 and an upper surface of the front floor panel 8 between each side sill 7 and the tunnel 14 in the vehicle width direction. The floor frame upper portion 11 is a frame having a hat-shaped section and extending in the vehicle front-rear direction, and forms, together with the dash panel 6 and the front floor panel 8, a closed cross-section extending in the vehicle front-rear direction.

As shown in FIGS. 6, 18, and 7, a floor frame lower portion 12 is fixedly joined to a lower surface of the front floor panel 8 between each side sill 7 and the battery device 16 in the vehicle width direction. The floor frame lower portion 12 is a frame having an inverted hat-shaped section and extending in the vehicle front-rear direction, and forms, together with the front floor panel 8, a closed cross-section extending in the vehicle front-rear direction.

As shown in FIG. 3, a front cross member or the first floor cross member (so-called No. 2 cross member) 30 as a floor cross member linearly extending in the vehicle width direction between the pair of left and right side sills 7, 7 is disposed on the upper surface of the front floor panel 8 near a rear end of the tunnel 14. As shown in FIG. 6, the front cross member 30 is fixedly joined to the front floor panel 8 below a front part of the front seat so as to linearly extend in the vehicle width direction between the left and right side sills 7, 7 at a height of an upper surface of each side sill inner portion 7B above the front floor panel 8. As shown in FIG. 16, the front cross member 30 has a hat-shaped section and forms, together with the front floor panel 8, a closed cross-section linearly extending in the vehicle width direction. As shown in FIG. 6, the front cross member 30 as the floor cross member has a substantially linear upper surface in the vehicle width direction.

Further, as shown in FIG. 6, the left and right floor frame lower portions 12, 12 (in FIG. 6, only the floor frame lower portion 12 on a vehicle right side is shown) extending in the vehicle front-rear direction are provided under the front floor panel 8 as described above, and the front cross member 30 includes a middle member 31 having a hat-shaped section located between the left and right floor frame lower portions 12, 12 and side members (or left and right end members) 32 each having a hat-shaped section located on vehicle-width-direction outer sides of the floor frame lower portions 12. The middle member 31 is formed of an ultrahigh tensile steel plate having a thickness of 1.8 mm, and the side members 32 are formed of a high tensile steel plate having a thickness of 1.0 mm.

Specifically, a part (middle member 31) of the front cross member 30 between the left and right floor frame lower portions 12 has higher rigidity than parts (side members 32) located on the vehicle-width-direction outer sides of the floor frame lower portions 12, and the middle member 31 is formed of one member.

As shown in FIGS. 3 and 6, a seat mounting bracket (or a front seat outer securing member) 34 that forms a securing portion 34a for the front part of the front seat is fixedly joined to an upper part of each side member 32 of the front cross member 30. As shown in FIG. 3, a middle cross member or a middle member (so-called No. 2.5 cross member) 41 as a second floor cross member linearly extending in the vehicle width direction between the pair of left and right side sills 7, 7 is disposed on the upper surface of the front floor panel 8 in a position spaced toward a vehicle rear side from the front cross member 30. The middle cross member 40 is provided in parallel with the front cross member 30.

As shown in FIG. 7, the middle cross member 40 is fixedly joined to the front floor panel 8 below a rear part of the front seat so as to linearly extend in the vehicle width direction between the left and right side sills 7, 7 above the front floor panel 8. As shown in FIG. 16, the middle cross member 40 has a hat-shaped section, and forms, together with the front floor panel 8, a closed cross-section 41h linearly extending in the vehicle width direction. As shown in FIG. 7, the middle cross member 40 includes a middle member 41 in a position corresponding to the battery device 16, and side members 42 located on the vehicle-width-direction outer sides of the battery device 16.

The middle member 41 may be formed of an ultrahigh tensile steel plate having a thickness of 1.8 mm, and the side members 42 may be formed of a high tensile steel plate having a thickness of 1.0 mm so that the middle member 41 has higher rigidity than the side members 42. The middle member 41 is formed of one member. Further, each side member 42 also serves as a seat mounting bracket, and includes, on its upper surface, a securing portion 42a for the rear part of the front seat.

As shown in FIG. 16, a standing bracket 70 fixedly stands upward on the front floor panel 8 between the front cross member 30 and the middle cross member 40 in the vehicle front-rear direction, in other words, on the rear side of the middle of the front cross member 30. As shown in FIGS. 15, 18, and 19, the standing bracket 70 has an M-shaped section in front view of the vehicle.

As shown in the enlarged sectional view in FIG. 19, the standing bracket 70 integrally includes two upper walls (or upper surfaces) 73, outer legs 74 and inner legs 71 extending downward from ends of the upper walls 73 in the vehicle width direction, a middle bottom wall 72 connecting lower ends of the inner legs 71 in the vehicle width direction, and flanges 75 extending outward from lower ends of the outer legs 74. The standing bracket 70 is fixedly joined to the front floor panel 8 by spot welding or the like at opposite sides and a middle shown by x in FIG. 15, specifically, at the flanges 75 and the middle bottom wall 72.

As shown in FIG. 15, the outer legs 74 and the inner legs 71 integrally include a plurality of beads . . . at predetermined intervals in the vehicle front-rear direction, which bulge outward and extend in the up-down direction. The flanges 75 and the middle bottom wall 72 are fixedly joined to the front floor panel 8 between the beads and between the beads and front and rear end surfaces of the standing bracket 70 (see x in FIG. 15).

As shown in FIGS. 16 and 5, a reinforcing bracket (or a bracket body) 63 as a vehicle body component having an inverted U-shaped section is provided on the tunnel 14 provided at the middle of the front part of the front floor panel 8 in the vehicle width direction. As shown in FIG. 5, the reinforcing bracket 63 integrally includes an upper wall (or a bracket upper surface) 632 and side walls (left and right bracket side walls) 631 extending downward from opposite sides of the upper wall 632 in the vehicle width direction. The upper wall 632 and the left and right side walls 631 of the reinforcing bracket 63 are welded to the tunnel 14 (see x in FIG. 5).

As shown in FIGS. 16 and 5, a rear reinforcement (or a reinforcement) 64 as a reinforcing element is provided on a lower surface of a rear part of the reinforcing bracket 63. As shown in FIG. 16, directly in front of the rear reinforcement 64, the upper wall 632 of the reinforcing bracket 63 and the upper wall of the tunnel 14 are connected by a connecting bracket 19 having a substantially Z-shape in side view.

As shown in FIGS. 3, 16, 9, and 8, a kick-up portion reinforcing element 50 that reinforces a kick-up portion 9 is provided on a rear part of the front floor panel 8 at the middle in the vehicle width direction. As shown in FIG. 9, the kick-up portion reinforcing element 50 includes an upper wall 51a, left and right side walls 51b, 51b extending downward from opposite sides of the upper wall 51a in the vehicle width direction, a front wall 51c extending downward from a front end of the upper wall 51a, and a flange 51d integrally formed to extend outward from lower ends of the side walls 51b and the front wall 51c.

As shown in FIG. 16, the upper wall 51a of the kick-up portion reinforcing element 50 has an opening, and a removable cover member 52 that covers the opening is provided on the upper wall 51a. As shown in FIG. 16, the kick-up portion 9 extends upward and then extends from its upper end toward the vehicle rear side. A rear cross member 15 (so-called No. 3 cross member) extending in the vehicle width direction is fixedly joined to a lower part of the kick-up portion 9, and forms, together with the kick-up portion 9, a closed cross-section extending in the vehicle width direction. As shown in FIG. 16, the rear floor pan 10 extending rearward is provided continuously with the kick-up portion 9.

In FIG. 3, rear side frames each has a closed cross-section structure extending in the vehicle front-rear direction on opposite sides of the rear floor pan 10 in the vehicle width direction. As shown in FIG. 3, a rear end of each side sill 7 extends toward the vehicle rear side to overlap a front end of the rear side frame.

As shown in FIGS. 3 and 16, a console support bracket (or second support bracket) 62 as a vehicle component is provided extending in the vehicle front-rear direction from a rear part of the reinforcing bracket 63 as a vehicle body component on an upper part of the tunnel 14 to a front part of the kick-up portion reinforcing element 50. The console support bracket 62 is disposed above the middle of the front cross member 30 in the vehicle width direction, the standing bracket 70, and the middle of the middle cross member 40 in the vehicle width direction, and supports a console (or a center console) 3.

As shown in FIG. 16, the console 3 includes a shift lever support bracket 5 that supports a shift lever 4b with a shift knob 4a in its upper part and has a lower part secured to the console support bracket 62 at front and rear.

As shown in FIG. 16, the shift lever support bracket 5 integrally includes an upper bracket 5a that supports the shift lever 4b, a middle bracket 5b, and a base bracket 5c. The entire console 3 is covered with an exterior member 3c, and includes a front console (or a center console front part) 3A on the front side of the base bracket 5c, and a rear console (or a center console rear part) 3B on the rear side of the base bracket 5c.

As shown in FIG. 16, a cup holder 3a is formed in an upper part of the rear console 3B directly on the rear side of the base bracket 5c, and an arm rest 3b openably/closably covers an article compartment formed on the rear side of the cup holder 3a.

As shown in FIG. 6, an upper enlarged section 30a with a section enlarged upward to a height of the console support bracket 62 is provided on a middle upper part of the front cross member 30 in the vehicle width direction, specifically, on a middle upper part of the middle member 31 in the vehicle width direction. In this embodiment, the upper enlarged section 30a is formed by a cross member reinforcing element 33 separate from the front cross member 30. This can form linear ridges as basic parts of the front cross member 30 in the vehicle width direction.

As shown in FIGS. 6 and 8, the cross member reinforcing element 33 includes an upper wall (or an upper surface) 33a, a front wall (or a front surface) 33b, a rear wall (or a rear surface) 33c, left and right side walls (or left and right side surfaces) 33d, and flanges (or left and right side flanges) 33e extending outward in the vehicle width direction from the side walls 33d. As shown in FIG. 8, the front wall 33b and the rear wall 33c are fixedly joined to front and rear walls of the front cross member 30. As shown in FIG. 6, the flanges 33e are fixedly joined to an upper wall of the front cross member 30.

As shown in FIG. 17, the console support bracket 62 includes an upper wall (or a bracket upper surface) 672, left and right side walls (or bracket side walls) 671, and flanges 673 extending outward in the vehicle width direction from lower ends of the side walls 671. The side walls 671 of the console support bracket 62 are secured via the flanges 673 to the upper wall 33a of the cross member reinforcing element 33 forming the upper enlarged section 30a.

As shown in FIG. 13, a vehicle-width-direction middle part of the upper wall 672 of the console support bracket 62 integrally includes a downward recess (or a recessed groove) 672a. The recess 672a extends from a front end of the console support bracket 62 to the vicinity of a rear end of the console support bracket 62 in the vehicle front-rear direction. By forming the recess 672a, a plurality of ridges 62g, 62*h*, 62*i*, 62*j*, 62*k* extending in the front-rear direction are formed in the upper wall 672 of the console support bracket 62.

As shown in FIGS. 6 and 17, in this embodiment, the left and right flanges 673 of the console support bracket 62 are co-fastened, together with a reinforcing support bracket (or fastening bracket) 35 described later, to the upper wall 33*a* of the cross member reinforcing element 33 by fastening members (or weld bolt) 36 such as bolts and nuts.

As shown in FIG. 6, securing portions for the front part of the front seat, that is, seat securing portions (or front seat inner securing portions) 33*f* are formed at the same height as the upper enlarged section 30*a* on opposite sides in the vehicle width direction of the upper wall 33*a* of the cross member reinforcing element 33 forming the upper enlarged section 30*a*. This can form linear ridges of the upper enlarged section 30*a* (that is, ridges of cross member reinforcing element 33) in the vehicle width direction. Front parts of seat slide rails 17, 17 are mounted to the seat securing portions 33*f* and the securing portions 34*a* of the seat mounting brackets 34 for the front part of the front seat by mounting members 38, 38. A front seat 18 (in this embodiment, driver's seat) is disposed above the seat slide rails 17, 17. In FIG. 6, a seat cushion of the front seat 18 is shown.

As shown in FIGS. 13 and 17, a front reinforcement (or a reinforcement) 68 as a reinforcing element is provided that reinforces a front part of the console support bracket 62 from below. As shown in FIG. 17, the front reinforcement 68 has an inverted U-shaped section and reinforces the upper wall 672 and the left and right side walls 671 of the console support bracket 62.

As shown in FIGS. 6 and 17, a front part of the base bracket 5*c* of the shift lever support bracket 5 is mounted to the console support bracket 62 above the front cross member 30 by mount rubbers 37 and mounting members (or weld bolts) 36 including bolts and nuts. The reinforcing support bracket 35 that supports an upper surface, that is, the upper wall 672 of the console support bracket 62 from below fixedly stands on an upper surface of the cross member reinforcing element 33.

As shown in FIG. 17, left and right lower parts of the base bracket 5*c* of the shift lever support bracket 5 integrally include flanges. The flanges are fastened to upper surfaces of the mount rubbers 37 by the mounting members 36 to mount the shift lever support bracket 5 to the console support bracket 62 at left and right.

As shown in FIGS. 6 and 17, the reinforcing support bracket 35 has an M-shaped section in front view of the vehicle. As shown in FIG. 17, left and right flanges 51*a*, 51*b* of the reinforcing support bracket 35 are mounted, together with the flanges 673 of the console support bracket 62, to the upper wall 33*a* of the cross member reinforcing element 33 by the fastening members 36.

The reinforcing support bracket 35 having the M-shaped section includes two upper walls 35*b*, and the upper walls 35*b* are co-fastened to the front reinforcement 68 and the console support bracket 62 so that three pieces overlap.

As shown in FIG. 7 that is a sectional view taken in the direction of arrow C-C in FIG. 3, a cross member reinforcing element (or cross member reinforcing element) 43 is fixedly joined to a middle upper part of the middle cross member 40 as the second floor cross member in the vehicle width direction. As shown in FIG. 8, the cross member reinforcing element 43 has a hat-shaped section, and forms an upper enlarged section 43*i* above the closed cross-section 41*h*.

As shown in FIG. 8, the middle cross member 40 as the second floor cross member is formed at a height lower than that of the console support bracket 62 on the rear side of the standing bracket 70. As shown in FIG. 7, the console support bracket 62 has an inverted U-shaped section in front view of the vehicle, and the side walls 671 of the console support bracket 62 are mounted to the middle cross member 40 via the cross member reinforcing element 43.

Specifically, as shown in FIG. 7, the left and right side walls 671 of the console support bracket 62 are mounted to an upper wall of the cross member reinforcing element 43 via the flanges 673. The flanges 673 are fastened to the cross member reinforcing element 43 by fastening members 54 such as bolts and nuts.

As shown in FIG. 7, securing portions for the rear part of the front seat, that is, seat securing portions are formed on opposite sides in the vehicle width direction of the cross member reinforcing element 43 forming the upper enlarged section 43*i*. Rear parts of the seat slide rails 17, 17 are mounted to the seat securing portions and the securing portions 42*a* of the side members 42 for the rear part of the front seat by mounting member 56, 56.

As shown in FIGS. 16 and 8, the shift lever support bracket 5 supports the shift lever 4*b*. As shown in FIG. 8, the shift lever support bracket 5 is secured across the cross member reinforcing element 33 on the upper part of the front cross member 30 and the front part of the standing bracket 70.

As described above with reference to FIGS. 6 and 17, front securing portions of the shift lever support bracket 5 are mounted, at left and right, to the cross member reinforcing element 33 by the mount rubbers 37 and the mounting members 36. As shown in FIGS. 18 and 19, rear securing portions of the shift lever support bracket 5 are mounted, at the left and right flanges of the base bracket 5*c*, to the upper walls 73 of the standing bracket 70 via the console support bracket 62 by mount rubbers 77, 77 and mounting members (or weld bolts and nuts) 76 such as bolts and nuts.

As shown in FIG. 8, the standing bracket 70 is formed to further extend rearward from rear mounting portions (see the positions of the mount rubbers 77 and the mounting members 76) of the shift lever support bracket 5. The upper wall 672 of the console support bracket 62 is secured to the standing bracket 70 on the rear side of the mounting portions of the shift lever support bracket 5 by mounting members such as bolts and nuts (not shown). As shown in FIGS. 18 and 19, an upper part of the standing bracket 70 is narrower than the console support bracket 62 in the vehicle width direction.

As shown in FIG. 5, the console support bracket 62 (vehicle component) is connected to the tunnel 14 via the reinforcing bracket 63 (vehicle body component). The upper walls 672, 632 and the side walls 671, 631 of the console support bracket 62 and the reinforcing bracket 63 are fastened together with the front reinforcement 68 and the rear reinforcement 64 by fastening members so that four pieces overlap.

Specifically, the upper wall 672 of the console support bracket 62, the front reinforcement 68, the upper wall 632 of the reinforcing bracket 63, and the rear reinforcement 64 are fastened by fastening members (or weld bolts and nuts) 54 such as bolts and nuts on the upper side, and the side walls 671 of the console support bracket 62, the front reinforcement 68, the side walls 631 of the reinforcing bracket 63, and the rear reinforcement 64 are fastened by fastening members T3 such as bolts and nuts on the lateral sides. As shown in FIGS. 1, and 16, a bottom console 81 is provided between a lower front end of the front console 3A and a lower part of the instrument panel 2.

The bottom console 81 integrally includes a bottom wall 81a located at the middle in the vehicle width direction, inner walls 81b rising upward from left and right ends of the bottom wall 81a in the vehicle width direction, and outer walls 81c extending downward from upper ends of the inner walls 81b. The bottom console 81 covers the front part of the console support bracket 62 and the reinforcing bracket 63 from above.

Further, as shown in FIGS. 16, and 13, a mounting bracket having an inverted U-shaped section is provided on a rear upper part of the console support bracket 62. A bracket 82 on the side of the rear console 3B is mounted to the mounting bracket by a mount rubber and a mounting member such as a bolt and a nut. In the drawings, an arrow F shows a vehicle front side, and an arrow R shows a vehicle rear side.

As described above, the lower vehicle-body structure of the electric vehicle according to the embodiment includes: the floor panel (see front floor panel 8) that forms the vehicle cabin floor; the floor cross member (see front cross member 30) disposed below the front part of the front seat to linearly extend in the vehicle width direction between the pair of left and right side sills 7, 7 at the height of the side sills 7 above the floor panel (front floor panel 8); and the console support bracket 62 that is disposed above the middle of the floor cross member (front cross member 30) and supports the console 3, the upper enlarged section 30a with the section enlarged upward to the height of the console support bracket 62 being provided on the middle upper part of the floor cross member (front cross member 30) (see FIGS. 6 and 17).

According to this configuration, the floor cross member (front cross member 30) linearly extends in the vehicle width direction between the pair of left and right side sills 7, 7 at the height of the side sills 7, 7. This can increase resistance to lateral collision.

The upper enlarged section 30a with the section enlarged upward to the height of the console support bracket 62 is provided on the middle upper part of the floor cross member (front cross member 30). This can increase resistance to lateral collision, eliminate the need to extend a lower end of the console support bracket 62 downward to the floor panel (front floor panel 8), and thus reduce weight of the console support bracket 62 and increase support rigidity of the console support bracket 62.

In one embodiment of the present disclosure, the console support bracket 62 includes the upper wall 672 and the left and right side walls 671 and has the inverted U-shape, and the side walls 671 of the console support bracket 62 are secured to the upper enlarged section 30a (see FIG. 17).

According to this configuration, the height of the side walls 671 of the console support bracket 62 can be reduced by the vertical height of the floor cross member (front cross member or first floor cross member 30) and the vertical height of the upper enlarged section 30a, thereby reducing weight of the console support bracket 62.

Further, in one embodiment of the present disclosure, the upper surface of the floor cross member (front cross member 30) is substantially linearly formed in the vehicle width direction, and the upper enlarged section 30a is formed by the cross member reinforcing element 33 separate from the floor cross member (front cross member 30) (see FIGS. 6 and 17). According to this configuration, the upper enlarged section 30a is formed separately from the floor cross member (front cross member 30). This can form the linear ridges X1, X2 (see FIG. 8) as the basic parts of the floor cross member (front cross member 30) and increase resistance to lateral collision.

Further, in one embodiment of the present disclosure, the left and right floor frames (see floor frame lower portions 12) extending in the vehicle front-rear direction are provided below the floor panel (front floor panel 8), and the part (see middle member 31) of the floor cross member between the left and right floor frames (floor frame lower portions 12) has higher rigidity than the parts (see side members 32) located on the vehicle-width-direction outer sides of the floor frames (floor frame lower portions 12), and is formed of one member (see FIG. 6).

In this embodiment, the parts located on the vehicle-width-direction outer sides of the floor frame lower portions 12 are formed of a high tensile steel plate having a thickness of 1.0 mm, and the part of the floor cross member between the left and right floor frame lower portions 12 is formed of an ultrahigh tensile steel plate having a thickness of 1.8 mm. However, the thicknesses and the materials are not limited to them. According to this configuration, lateral collision energy is absorbed by the outer parts (side members 32) of the floor cross member (front cross member 30) located on the vehicle-width-direction outer sides of the floor frames (floor frame lower portions 12), and the part (middle member 31) of the floor cross member between the left and right floor frames (floor frame lower portions 12), that is, the basic part is formed of one member, thereby increasing resistance to lateral collision.

In addition, in one embodiment of the present disclosure, the securing portions for the front part of the front seat (see seat securing portions 33f) are formed on the opposite sides of the upper enlarged section 30a in the vehicle width direction at the same height as the upper enlarged section 30a (see FIG. 6). This configuration can form the linear ridges X3, X4 (see FIG. 8) of the upper enlarged section 30a in the vehicle width direction, increase resistance to lateral collision, and also improve formability of the cross member reinforcing element 33.

In one embodiment of the present disclosure, the shift lever support bracket 5 is mounted to the console support bracket 62 above the floor cross member (front cross member 30), and the reinforcing support bracket 35 that supports the upper surface of the console support bracket 62 from below fixedly stands on the upper surface of the cross member reinforcing element 33 (see FIGS. 6 and 17). According to this configuration, providing the reinforcing support bracket 35 can increase rigidity of the upper enlarged section 30a in the up-down direction.

Further, in one embodiment of the present disclosure, the shift lever support bracket 5 is mounted to the console support bracket 62 at left and right, and the reinforcing support bracket 35 has the M-shaped section in front view of the vehicle (see FIGS. 6 and 17). According to this configuration, forming the reinforcing support bracket 35 to have the M-shaped section can increase rigidity of the reinforcing support bracket 35 itself and thus increase rigidity of the shift lever support bracket 5 between left and right support portions.

In addition, in one embodiment of the present disclosure, the reinforcing support bracket 35 is mounted to the cross member reinforcing element 33 together with the console support bracket 62 (see FIG. 17). According to this configuration, the cross member reinforcing element 33, the reinforcing support bracket 35, and the console support bracket 62 are co-fastened, which can provide a large interval between support portions of the reinforcing support bracket 35 and allow sharing of the support portions (see co-fastening portions by fastening members 36).

For correspondence between the configuration of the claims and the above described embodiment, the floor panel of the claims corresponds to the front floor panel 8 of the embodiment. Similarly, the floor cross member corresponds to the front cross member 30 (so-called No. 2 cross member), the floor frame corresponds to the floor frame lower portion 12, and the securing portion for the front part of the front seat corresponds to the seat securing portion 33f. However, the present disclosure is not limited to the configuration of the above described embodiment.

As described above, the present disclosure is applicable to a lower vehicle-body structure of an electric vehicle including a console support bracket that supports a console.

Accordingly, the disclosure describes the following items:

Item 1. A lower vehicle-body structure of an electric vehicle that uses output from a rotary electric machine as a drive force, comprising:
a pair of left and right side sills extending in a vehicle front-rear direction;
a substantially flat floor panel disposed between the side sills; and
a floor cross member disposed on an upper surface of the floor panel between a front seat and a rear seat on which occupants sit, and connecting the left and right side sills in a vehicle width direction at a height lower than a height from the floor panel to an upper surface of each side sill,
wherein the floor cross member includes, in a vertical section along the vehicle-width direction, an upper enlarged section with a section enlarged toward a vehicle upper side substantially at a middle in the vehicle-width direction so that an upper surface of the upper enlarged section is located on the vehicle upper side with respect to upper surfaces near ends of the floor cross member in the vehicle width direction.

Item 2. The lower vehicle-body structure of an electric vehicle according to item 1, wherein the floor cross member includes a cross member body connecting the left and right side sills and forming, together with the floor panel, a closed cross-section extending in the vehicle width direction, and a cross member reinforcing element secured to the cross member body and forming the upper enlarged section, and
the cross member body has an upper surface with a substantially rectangular flat shape in plan view.

Item 3. The lower vehicle-body structure of an electric vehicle according to item 2, further comprising a pair of left and right floor frames disposed on the floor panel and extending near the side sills in the vehicle front-rear direction,
wherein the cross member body includes a member middle portion located between the floor frames, and a pair of left and right member end portions located at opposite ends of the member middle portion in the vehicle width direction, and
the member middle portion is formed of one member having higher rigidity than the member end portions.

Item 4. The lower vehicle-body structure of an electric vehicle according to item 2 or 3, wherein the cross member reinforcing element is joined to the floor panel with a lower end of the cross member body being interposed between the cross member reinforcing element and the floor panel in a vertical section along the vehicle front-rear direction, and forms a closed cross-section together with the cross member body.

Item 5. The lower vehicle-body structure of an electric vehicle according to any one of items 2 to 4, wherein an upper surface of the cross member reinforcing element includes, at opposite ends in the vehicle width direction, seat securing portions to which rear legs of the front seat are secured, and
the seat securing portions are formed substantially in a same position in the vehicle up-down direction as a substantial middle of the upper surface of the upper enlarged section in the vehicle-width direction in the vertical section along the vehicle width direction.

Item 6. The lower vehicle-body structure of an electric vehicle according to any one of items 1 to 5, further comprising an elongated member that is long in the vehicle front-rear direction and has a front part and a rear part connected to a vehicle body,
wherein the elongated member includes a pair of left and right side walls facing each other in the vehicle width direction and has a substantially inverted U-shaped vertical section along the vehicle width direction, and
the side walls of the elongated member are secured to the upper enlarged section of the floor cross member.

Item 7. A lower vehicle-body structure of an electric vehicle comprising:
a floor panel that forms a vehicle cabin floor;
a floor cross member disposed below a front part of a front seat to linearly extend in a vehicle width direction between a pair of left and right side sills at a height of the side sills above the floor panel; and
a console support bracket that is disposed above a middle of the floor cross member and supports a console,
wherein an upper enlarged section with a section enlarged upward to a height of the console support bracket is provided on a middle upper part of the floor cross member.

Item 8. The lower vehicle-body structure of an electric vehicle according to item 7, wherein the console support bracket includes an upper wall and left and right side walls and has an inverted U-shape, and the side walls of the console support bracket are secured to the upper enlarged section.

Item 9. The lower vehicle-body structure of an electric vehicle according to item 8, wherein an upper surface of the floor cross member is substantially linearly formed in the vehicle width direction, and the upper enlarged section is formed by a cross member reinforcing element separate from the floor cross member.

Item 10. The lower vehicle-body structure of an electric vehicle according to item 9, wherein left and right floor frames extending in a vehicle front-rear direction are provided below the floor panel, and
a part of the floor cross member between the left and right floor frames has higher rigidity than parts located on vehicle-width-direction outer sides of the floor frames, and is formed of one member.

Item 11. The lower vehicle-body structure of an electric vehicle according to item 9 or 10, wherein securing portions for the front part of the front seat are formed on opposite sides of the upper enlarged section in the vehicle width direction at the same height as the upper enlarged section.

Item 12. The lower vehicle-body structure of an electric vehicle according to any one of items 9 to 11, wherein a shift lever support bracket is mounted to the console support bracket above the floor cross member, and
a reinforcing support bracket that supports an upper surface of the console support bracket from below fixedly stands on an upper surface of the cross member reinforcing element.

Item 13. The lower vehicle-body structure of an electric vehicle according to item 12, wherein the shift lever support bracket is mounted to the console support bracket at left and right, and the reinforcing support bracket has an M-shaped section in front view of the vehicle.

Item 14. The lower vehicle-body structure of an electric vehicle according to item 12 or 13, wherein the reinforcing support bracket is mounted to the cross member reinforcing element together with the console support bracket.

What is claimed is:

1. A lower vehicle-body structure of an electric vehicle configured to use output from a rotary electric machine as a drive force, comprising:
    a pair of left and right side sills extending in a vehicle front-rear direction;
    a substantially flat floor panel disposed between the side sills;
    a first floor cross member disposed on an upper surface of the floor panel located below a front part of a front seat and connecting the left and right side sills in a vehicle-width direction;
    a second floor cross member disposed on an upper surface of the floor panel located below a rear part of the front seat and connecting the left and right side sills in the vehicle-width direction;
    a kick-up portion raised from a rear end of the floor panel toward a vehicle upper side; and
    a console support bracket that has a front part connected to a vehicle body on a vehicle front side and a rear part connected to the kick-up portion, and configured to support a center console, a lower part of the console support bracket being secured to the first floor cross member and the second floor cross member.

2. The lower vehicle-body structure according to claim 1, wherein
    the console support bracket includes
        a pair of left and right bracket side walls facing each other in the vehicle-width direction, and
        a bracket upper surface connecting upper ends of the bracket side walls,
    and has a substantially inverted U-shaped vertical section along the vehicle-width direction.

3. The lower vehicle-body structure according to claim 2, wherein
    the bracket side walls of the console support bracket include flanges extending from lower ends of the bracket side walls toward vehicle-width-direction outer sides.

4. The lower vehicle-body structure according to claim 3, wherein
    the flanges of the console support bracket are fastened to the first floor cross member and the second floor cross member.

5. The lower vehicle-body structure according to claim 4, wherein
    the first floor cross member and the second floor cross member include, in vertical sections along the vehicle-width direction, upper enlarged sections with sections enlarged toward the vehicle upper side substantially at a middle in the vehicle-width direction so that upper surfaces of the first floor cross member and the second floor cross member substantially at the middle in the vehicle-width direction are located on the vehicle upper side with respect to upper surfaces near ends in the vehicle-width direction, and the flanges of the console support bracket are fastened to the upper enlarged section of the first floor cross member and the upper enlarged section of the second floor cross member.

6. The lower vehicle-body structure according to claim 2, wherein
    the floor panel includes an expanding portion expanding toward the vehicle upper side on the vehicle front side of the first floor cross member, and
    the bracket upper surface and the left and right bracket side walls of the console support bracket are secured to the expanding portion of the floor panel.

7. The lower vehicle-body structure according to claim 2, further comprising:
    a kick-up reinforcing portion connecting a substantial middle of the kick-up portion in the vehicle-width direction and the floor panel in front of the substantial middle of the kick-up portion, wherein
    the kick-up reinforcing portion integrally includes a pair of left and right side walls facing each other in the vehicle-width direction, a front wall connecting front ends of the side walls, and an upper surface connecting upper ends of the side walls,
    the bracket upper surface of the console support bracket is fastened to the upper surface of the kick-up reinforcing portion, and
    the bracket side walls of the console support bracket are fastened to the side walls of the kick-up reinforcing portion.

8. The lower vehicle-body structure according to claim 2, further comprising:
    a standing bracket standing toward the vehicle upper side on the floor panel between the first floor cross member and the second floor cross member, wherein
    the standing bracket includes a pair of left and right legs secured to the floor panel and an upper surface connecting upper ends of the legs, and
    the bracket upper surface of the console support bracket is fastened to the upper surface of the standing bracket.

9. The lower vehicle-body structure according to claim 8, further comprising:
    a shift lever support bracket that is secured to the bracket upper surface of the console support bracket and supports a shift lever, wherein
    the bracket upper surface and the flanges of the console support bracket are secured to the first floor cross member,
    the bracket upper surface of the console support bracket is secured to the standing bracket, and
    the flanges of the console support bracket are secured to the second floor cross member.

10. The lower vehicle-body structure according to claim 5, wherein
    the second floor cross member includes a cross member body connecting the left and right side sills and forming, together with the floor panel, a closed cross-section extending in the vehicle width direction, and a cross member reinforcing element secured to the cross member body and forming the upper enlarged section, and
    the cross member body has an upper surface with a substantially rectangular flat shape in plan view.

11. The lower vehicle-body structure according to claim 10, further comprising:
    a pair of left and right floor frames disposed on the floor panel and extending along or near the side sills in the vehicle front-rear direction, wherein the cross member body includes a member middle portion located between the floor frames, and a pair of left and right member end portions located at opposite ends of the member middle portion in the vehicle width direction, and the member middle portion is formed of one member having higher rigidity than a rigidity of the member end portions.

12. The lower vehicle-body structure according to claim 10, wherein the cross member reinforcing element is joined to the floor panel with a lower end of the cross member body being interposed between the cross member reinforcing element and the floor panel in a vertical section along the vehicle front-rear direction, and forms a closed cross-section together with the cross member body.

13. The lower vehicle-body structure according to claim 10, wherein an upper surface of the cross member reinforcing element includes, at opposite ends in the vehicle width direction, seat securing portions to which rear legs of the front seat are secured, and the seat securing portions are formed substantially in a same position in the vehicle up-down direction as a substantial middle of the upper surface of the upper enlarged section in the vehicle-width direction in the vertical section along the vehicle width direction.

14. The lower vehicle-body structure according to claim 10, wherein the upper enlarged section is formed by a cross member reinforcing element separate from the first floor cross member, a shift lever support bracket is mounted to the console support bracket above the first floor cross member, and a reinforcing support bracket or a fastening bracket that supports an upper surface of the console support bracket from below fixedly stands on an upper surface of the cross member reinforcing element.

15. The lower vehicle-body structure according to claim 14, wherein the shift lever support bracket is mounted to the console support bracket at left and right, and the reinforcing support bracket has an M-shaped section in front view of the vehicle.

16. The lower vehicle-body structure according to claim 14, wherein the reinforcing support bracket is mounted to the cross member reinforcing element together with the console support bracket.

17. The lower vehicle-body structure according to claim 3, wherein the floor panel includes an expanding portion expanding toward the vehicle upper side on the vehicle front side of the first floor cross member, and the bracket upper surface and the left and right bracket side walls of the console support bracket are secured to the expanding portion of the floor panel.

18. The lower vehicle-body structure according to claim 3, further comprising:

a kick-up reinforcing portion connecting a substantial middle of the kick-up portion in the vehicle-width direction and the floor panel in front of the substantial middle of the kick-up portion, wherein the kick-up reinforcing portion integrally includes a pair of left and right side walls facing each other in the vehicle-width direction, a front wall connecting front ends of the side walls, and an upper surface connecting upper ends of the side walls, the bracket upper surface of the console support bracket is fastened to the upper surface of the kick-up reinforcing portion, and the bracket side walls of the console support bracket are fastened to the side walls of the kick-up reinforcing portion.

19. The lower vehicle-body structure according to claim 3, further comprising:

a standing bracket standing toward the vehicle upper side on the floor panel between the first floor cross member and the second floor cross member, wherein the standing bracket includes a pair of left and right legs secured to the floor panel and an upper surface connecting upper ends of the legs, and the bracket upper surface of the console support bracket is fastened to the upper surface of the standing bracket.

20. The lower vehicle-body structure according to claim 11, wherein the cross member reinforcing element is joined to the floor panel with a lower end of the cross member body being interposed between the cross member reinforcing element and the floor panel in a vertical section along the vehicle front-rear direction, and forms a closed cross-section together with the cross member body.

* * * * *